United States Patent
Hiramoto

(10) Patent No.: US 9,294,405 B2
(45) Date of Patent: Mar. 22, 2016

(54) COMPUTER SYSTEM, COMMUNICATIONS CONTROL DEVICE, AND CONTROL METHOD FOR COMPUTER SYSTEM

(71) Applicant: FUJITSU LIMITED, Kawasaki-shi, Kanagawa (JP)

(72) Inventor: Shinya Hiramoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/300,264

(22) Filed: Jun. 10, 2014

(65) Prior Publication Data
US 2014/0293797 A1   Oct. 2, 2014

Related U.S. Application Data

(63) Continuation of application No. PCT/JP2011/080400, filed on Dec. 28, 2011.

(51) Int. Cl.
  *G01R 31/08* (2006.01)
  *H04L 12/801* (2013.01)
  *H04L 12/825* (2013.01)
  *G06F 15/173* (2006.01)

(52) U.S. Cl.
  CPC .......... *H04L 47/12* (2013.01); *G06F 15/17368* (2013.01); *H04L 47/25* (2013.01)

(58) Field of Classification Search
  CPC ....................................................... H04L 47/10
  USPC ....................................................... 370/236
  See application file for complete search history.

(56) References Cited

U.S. PATENT DOCUMENTS

| 6,175,570 B1 | 1/2001 | Cukier et al. |
| 2005/0063458 A1 | 3/2005 | Miyake et al. |
| 2008/0084889 A1 | 4/2008 | Archer et al. |

FOREIGN PATENT DOCUMENTS

| EP | 1411684 A2 | 4/2004 |
| JP | 10-32588 | 2/1998 |
| JP | 2000-165394 | 6/2000 |
| JP | 2005-64598 A | 3/2005 |

OTHER PUBLICATIONS

JCN Newswire, "The National Institute of Advanced Industrial Science and Technology (AIST) Released Network Traffic Smoothing Software PSPacer 1.0". Jun. 7, 2005, URL: http://www.japancorp.net/japan/Article.Asp?Art_ID=29900. English Translation.

(Continued)

*Primary Examiner* — Samina Choudhry
(74) *Attorney, Agent, or Firm* — Fujitsu Patent Center

(57) ABSTRACT

In a case where data is output, a transmission node number stored by a transmission node number storing unit is updated. As a result of comparison between a transmission node number included in data input by an input unit and the transmission node number stored by the transmission node number storing unit, in a case where the transmission node number stored by the transmission node number storing unit is larger than the transmission node number included in the data input by the input unit, by overwriting the transmission node number included in data output by an output unit with the transmission node number stored in the transmission node number storing unit, congestion control matching the communication state of a communication route can be efficiently realized.

12 Claims, 35 Drawing Sheets

(56) References Cited

OTHER PUBLICATIONS

Haruyuki Takaue et al., "Optimal All-to-All Communication Algorithm on 2-dimensional Mesh Network and Torus Network", Transactions of Information Processing Society of Japan Computing System, Jun. 2010, vol. 3, No. 2, pp. 88-98. English Abstract.

Ryoichi Kawahara et al., "ABR Traffic Characteristics in the Presence of CBR/VBR Traffic", IEICE Technical Report, vol. 97, No. 617, Mar. 1998, pp. 49-54. English Abstract.

Yuichiro Hei et al., "A Study on Data Traffic Flow Control in ATM Networks", IEICE Technical Report, vol. 97, No. 618, Mar. 1998, pp. 13-18. English Abstract.

International Search Report, mailed in connection with PCT/JP2011/080400 and mailed Apr. 10, 2012.

Japanese Office Action mailed Dec. 2, 2014 for corresponding Japanese Patent Application No. 2013-551129, with Partial English Translation, 8 pages.

Extended European Search Report dated Aug. 11, 2015 for corresponding European Patent Application No. 11878739.9, 5 pages.

Chinese Office Action mailed on Dec. 18, 2015 for corresponding Chinese Patent Application No. 201180076079.0, with English Translation, 21 pages.

FIG. 4

TRANSMISSION PACKET FORMAT

| PACKET TYPE | ROUTING HEADER | LOCAL NODE ADDRESS |
|---|---|---|
| REMOTE NODE ADDRESS | OFFSET | TRANSMISSION NODE NUMBER |
| PAYLOAD | | |

FIG. 5

NODE ADDRESS FORMAT

| X | Y |
|---|---|

FIG. 6

ROUTING HEADER FORMAT

| DX | DY |
|----|----|

FIG. 7

RESPONSE PACKET FORMAT

| PACKET TYPE | ROUTING HEADER | LOCAL NODE ADDRESS |
|---|---|---|
| REMOTE NODE ADDRESS | TRANSMISSION NODE NUMBER | |

FIG. 11A STORE TRANSMISSION NODE IN EACH PORT OF SWITCH
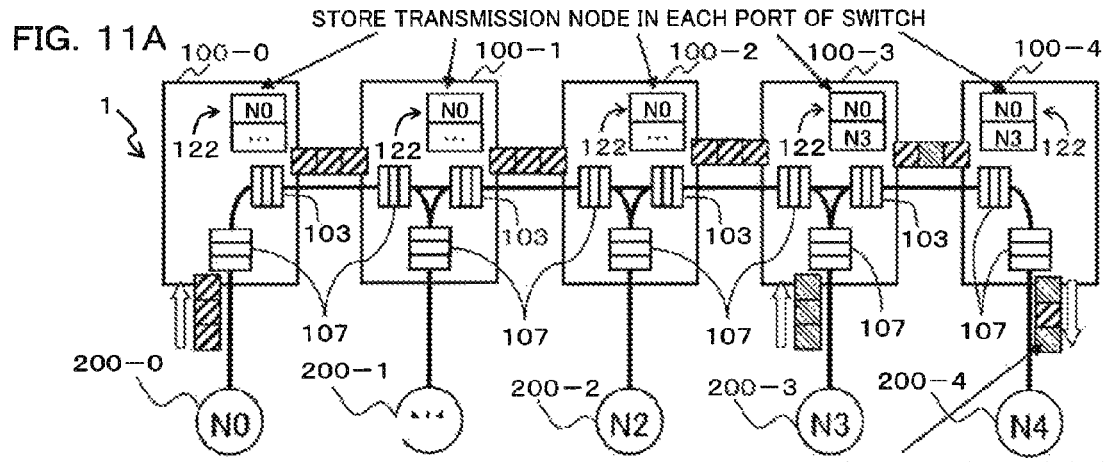
PACKET STORES TRANSMISSION NODE NUMBER OF SWITCH THROUGH WHICH IT PASSES
FIG. 11B
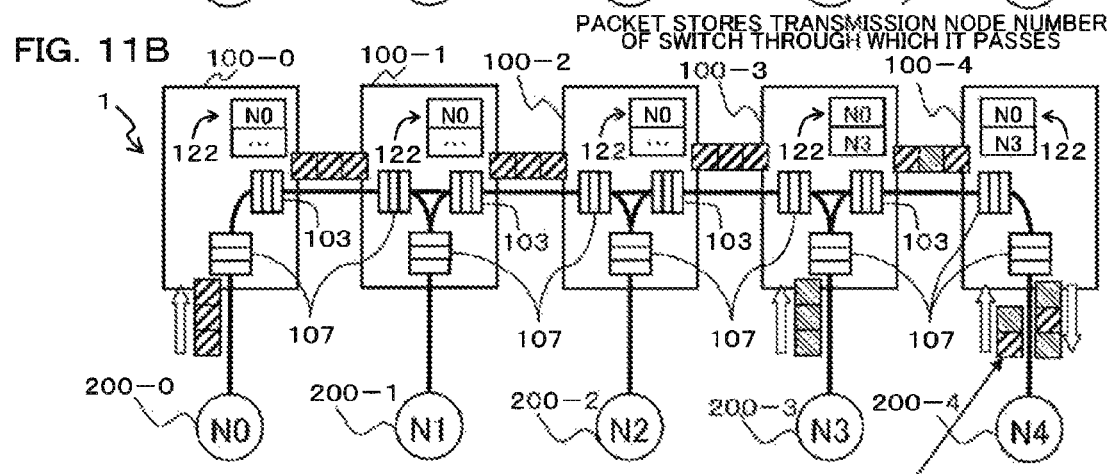
RECEPTION NODE TRANSMITS PACKET IN WHICH TRANSMISSION NODE NUMBER IS RECORDED TO TRANSMISSION NODE
FIG. 11C
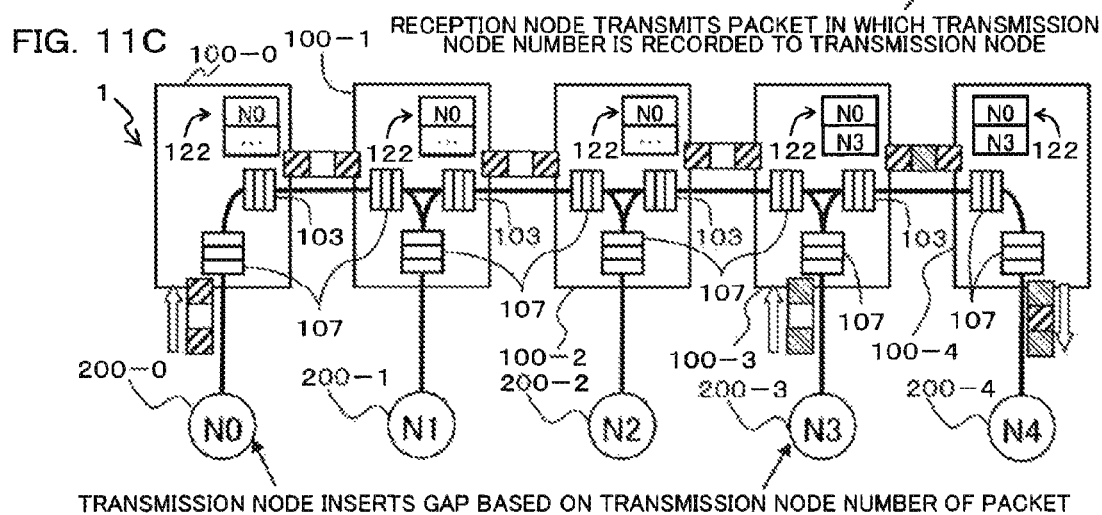
TRANSMISSION NODE INSERTS GAP BASED ON TRANSMISSION NODE NUMBER OF PACKET

FIG. 15

TRANSMISSION PACKET FORMAT

| PACKET TYPE | ROUTING HEADER | LOCAL NODE ADDRESS |
|---|---|---|
| REMOTE NODE ADDRESS | END FLAG | OFFSET |
| TRANSMISSION NODE NUMBER | PAYLOAD | |

FIG. 17

TRANSMISSION PACKET FORMAT

| PACKET TYPE | ROUTING HEADER | LOCAL NODE ADDRESS |
|---|---|---|
| REMOTE NODE ADDRESS | END FLAG | OFFSET |
| TRANSMISSION NODE NUMBER | MESSAGE LENGTH | |
| PAYLOAD |||

FIG. 20

TRANSMISSION PACKET FORMAT

| PACKET TYPE | ROUTING HEADER | LOCAL NODE ADDRESS |
|---|---|---|
| REMOTE NODE ADDRESS | END FLAG | OFFSET |
| TRANSMISSION NODE NUMBER | MESSAGE NUMBER | |
| PAYLOAD | | |

FIG. 22

RESPONSE PACKET FORMAT

| PACKET TYPE | ROUTING HEADER | LOCAL NODE ADDRESS |
|---|---|---|
| REMOTE NODE ADDRESS | END FLAG | TRANSMISSION NODE NUMBER |
| MESSAGE NUMBER | | |

FIG. 26

TRANSMISSION NODE NUMBER FORMAT

| TRANSMISSION NODE NUMBER OF DIMENSION X | TRANSMISSION NODE NUMBER OF DIMENSION Y |
|---|---|

FIG. 30

TRANSMISSION PACKET FORMAT

| PACKET TYPE | ROUTING HEADER | LOCAL NODE ADDRESS | | |
|---|---|---|---|---|
| REMOTE NODE ADDRESS | | START FLAG | END FLAG | OFFSET |
| TRANSMISSION NODE NUMBER | PAYLOAD | | | |

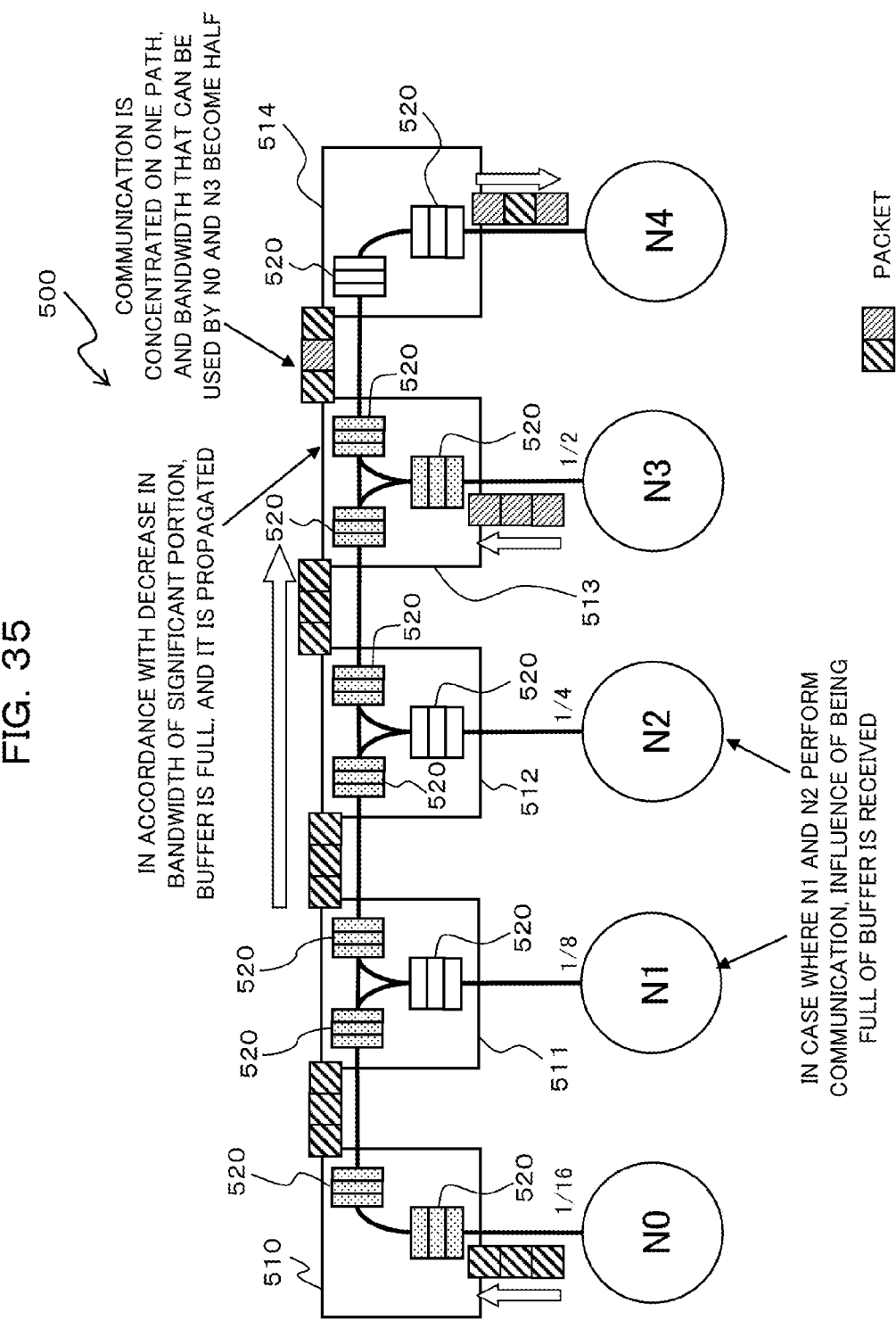

COMPUTER SYSTEM, COMMUNICATIONS CONTROL DEVICE, AND CONTROL METHOD FOR COMPUTER SYSTEM

CROSS-REFERENCE TO RELATED APPLICATION

This application is a continuation application of International Application PCT/JP2011/080400, filed on Dec. 28, 2011 and designated the U.S., the entire contents of which are incorporated herein by reference.

FIELD

The embodiments discussed herein are directed to a computer system, a communication control device, and a control method for a computer system.

BACKGROUND

Conventionally, parallel computers each including a plurality of nodes performing arithmetic processing are known. The nodes included in a parallel computer are interconnected through a network including a plurality of communication devices, routing devices (for example, switches), and the like and perform data communication with one another.

FIG. 34 is a diagram that illustrates an example of the configuration of a parallel computer 500.

The parallel computer 500 illustrated in FIG. 34 includes nodes N0 to N4 that perform computations and switches 510 to 514 that transmit received data to nodes of specific transmission destinations. The switches 510 to 514 configure a one-dimensional mesh-type network in which the switches are arranged on a straight line as a network topology.

When a switch receives a packet from an input port to which a node or another switch is connected, the above-described switch determines an output port to which a packet is output based on destination information included in the received packet. Then, the switch outputs the packet to the determined output port.

In addition, the switch includes a buffer 520 that temporarily stores received data or data to be output. In a case where an output contention occurs, the switch selects one packet, transmits the selected packet, and stores the other contending packets in the buffer 520.

In a case where a plurality of packets to be output to the same output port are received, the switch performs adjustment such that the numbers of packets to be output to the output port from input ports are uniform. Then, the switch transmits the packets from the output port in accordance with a result of the adjustment.

When packets exceeding the amount to be flown per unit time by the link are transmitted in the network, congestion occurs.

In the above-described parallel computer 500, when communication is concentrated on some switches, the communication bandwidth of a node decreases more as the number of hops of the node up to a switch on which communication is concentrated increases. In this case, the arrival of data at a destination node from a node having a large number of hops is delayed more than the arrival of data from a node having a small number of hops.

FIG. 35 is an exemplary diagram in which data is transmitted from the nodes N0 and N3 to the node N4.

Generally, a switch is adjusted such that packets from each input port are uniformly output. In other words, a switch adjusts packets to be input such that the numbers of packets output to output ports out of packets input to each input port are uniform, in other words, are respectively a half thereof. Accordingly, the number of packets that are transmitted from the node N3 to the switch 513 and are transmitted from the switch 513 to the switch 514 is a half of the number of all the packets transmitted from the switch 513 to the switch 514.

In the example illustrated in FIG. 35, in a route from the switch 513 to the node N4, packets transmitted from the node N0 and packets transmitted from the node N3 overlap each other, and communication bands for using the nodes N0 and N3 respectively become a half. However, since the nodes N0 and N3 continuously output packets in a maximum band, the buffer 520 is in a full (buffer-full) state. Hereinafter, the buffer-full state may be represented as the buffer 520 being full.

In a case where the being full of the buffer 520 occurs, for example, according to a communication control technique in which a packet is transmitted after a notification of vacancy of the buffer 520 of the transmission destination is received, there is a delay due to the notification. On the other hand, according to a communication control technique in which a packet is transmitted without checking the vacancy of the buffer 520 of the transmission destination, since a packet is discarded in a case where the buffer 520 of the transmission destination is in the full state, there is a need for retransmitting the packet. In other words, the communication performance is degraded in accordance with the delay caused by such a notification or packet retransmission.

In addition, the communication of the other nodes is influenced by the being full of the buffer 520. For example, in a case where buffers 520 of the switches 511 and 512 are full, it is necessary for communication between nodes N1 and N2 to be in a standby state until there is a vacancy in the buffer 520. In other words, the congestion propagates.

Here, a transmission method has been known in which a special gap packet is put between packets, the number of packets is adjusted based on the gap packet that has been put, and accordingly, discard of data and retransmission of data are suppressed.

CITATION LIST

Non Patent Literature

Non Patent Literature 1: "JCNnetwork=Advanced Industrial Science and Technology, Software PSPacer 1.0 for Smoothing Network Traffic Has Been Disclosed=", URL: "http://www.japancorp.net/japan/Article.Asp?Art_ID=29900"

In the parallel computer system as described above, a desirable degree of the gap to be inserted between packets depends on a combination (communication pattern) of a transmission source and a transmission destination of packets. However, it is difficult to determine a gap section by predicting the degree of overlapping between communications according to a communication pattern in advance. In addition, in a case where the communication pattern is irregular such as being random, it is further difficult to predict the overlapping between communications of packets.

SUMMARY

According to an aspect of the embodiments, there is provided a computer system including: a plurality of communication control devices; a plurality of computation nodes of transmission sources that transmit data through the communication control devices; and a plurality of computation nodes of transmission destinations that receive data through the communication control devices. The computation node of the transmission source includes: a data transmitting unit that transmits data to the computation node of the transmission destination; and an adjustment unit that adjusts an interval between data transmitted by the data transmitting unit based on a transmission node number included in received control data. The communication control device includes: an input unit that inputs the data transmitted by the computation node of the transmission source; an output unit that outputs data to be transmitted to the computation node of the transmission destination; a transmission node number storing unit that stores the transmission node number representing the number of the computation nodes transmitting data through the communication control device; an update processing unit that updates the transmission node number stored by the transmission node number storing unit in a case where the output unit outputs data; a comparison unit that compares a transmission node number included in the data input by the input unit and the transmission node number stored by the transmission node number storing unit with each other; and an overwriting unit that overwrites the transmission node number included in the data output by the output unit with the transmission node number stored in the transmission node number storing unit in a case where the transmission node number stored in the transmission node number storing unit is larger than the transmission node number included in the data input by the input unit as a result of the comparison performed by the comparison unit. The computation node of the transmission destination includes a control data transmitting unit that transmits the control data including the transmission node number included in the received data to the computation node of the transmission source.

In addition, there is provided a communication control device including: an input unit that inputs data transmitted by a computation node of a transmission source that transmits data through the communication control device; an output unit that outputs data to be transmitted to a computation node of a transmission destination that receives data through the communication control device; a transmission node number storing unit that stores a transmission node number representing the number of the computation nodes transmitting data through the communication control device; an update processing unit that updates the transmission node number stored by the transmission node number storing unit in a case where the output unit outputs data; a comparison unit that compares a transmission node number included in the data input by the input unit and the transmission node number stored by the transmission node number storing unit with each other; and an overwriting unit that overwrites the transmission node number included in the data output by the output unit with the transmission node number stored in the transmission node number storing unit in a case where the transmission node number stored in the transmission node number storing unit is larger than the transmission node number included in the data input by the input unit as a result of the comparison performed by the comparison unit.

Furthermore, there is provided a method of controlling a computer system that includes a plurality of communication control devices, a plurality of computation nodes of transmission sources that transmit data through the communication control devices, and a plurality of computation nodes of transmission destinations that receive data through the communication control devices. The method includes: transmitting data to the computation node of the transmission destination using a data transmitting unit included in the computation node of the transmission source; adjusting an interval between data transmitted by the data transmitting unit based on the transmission node number included in received control data using an adjustment unit included in the computation node of the transmission source and inputting the data transmitted by the computation node of the transmission source using an input unit included in the communication control device; outputting data to be transmitted to the computation node of the transmission destination using an output unit included in the communication control device when a transmission node number storing unit included in the communication control device stores the transmission node number representing the number of the computation nodes transmitting data through the communication control device; updating the transmission node number stored by the transmission node number storing unit using an update processing unit included in the communication control device in a case where the output unit outputs data; comparing a transmission node number included in the data input by the input unit and the transmission node number stored by the transmission node number storing unit with each other using a comparison unit included in the communication control device; overwriting the transmission node number included in the data output by the output unit with the transmission node number stored in the transmission node number storing unit using an overwriting unit included in the communication control device in a case where the transmission node number stored in the transmission node number storing unit is larger than the transmission node number included in the data input by the input unit as a result of the comparison performed by the comparison unit; and transmitting the control data including the transmission node number included in the received data to the computation node of the transmission source using a control data transmitting unit included in the computation node of the transmission destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an exemplary diagram that schematically illustrates the format of a transmission packet in the parallel computer system as the example of the first embodiment.

FIG. 5 is an exemplary diagram that illustrates the formats of a local node address and a remote node address in the parallel computer system as the example of the first embodiment.

FIG. 6 is an exemplary diagram that illustrates the format of a routing header in the parallel computer system as the example of the first embodiment.

FIG. 7 is an exemplary diagram that schematically illustrates the format of a response packet in the parallel computer system as the example of the first embodiment.

FIGS. 11A, 11B, and 11C are diagrams that illustrate an overview of a technique for communicating packets in the parallel computer system as the example of the first embodiment.

FIG. 15 is an exemplary diagram that schematically illustrates the format of a transmission packet in a parallel computer system as an example of a second embodiment.

FIG. 17 is an exemplary diagram that schematically illustrates the format of a transmission packet in a parallel computer system as an example of a third embodiment.

FIG. 20 is an exemplary diagram that schematically illustrates the format of a transmission packet in the parallel computer system as the example of the fourth embodiment.

FIG. 22 is an exemplary diagram that schematically illustrates the format of a response packet in the parallel computer system as the example of the fourth embodiment.

FIG. 26 is a diagram that schematically illustrates an example of the format of a transmission node number that is stored in a transmission packet of the parallel computer system as the example of the fifth embodiment.

FIG. 30 is an exemplary diagram that schematically illustrates the format of a transmission packet in the parallel computer system as the example of the seventh embodiment.

FIG. 35 is a diagram that illustrates an example of transmission of data from nodes N0 and N3 to a node N4.

DESCRIPTION OF EMBODIMENT(S)

Hereinafter, a computer system, a communication control device, and a control method for a computer system according to embodiments will be described with reference to the drawings. However, the embodiments illustrated below are merely examples but are not for the intention of excluding various modified examples or the application of various technologies that are not clearly expressed in the embodiments. In other words, these embodiments may be performed with various modifications (a combination of an embodiment and each modified example or the like) in a range not departing from the concept thereof. In addition, each diagram is not intended to include only constituent elements illustrated in the diagram but may include any other function or the like.

(A) First Embodiment

Figure 1:
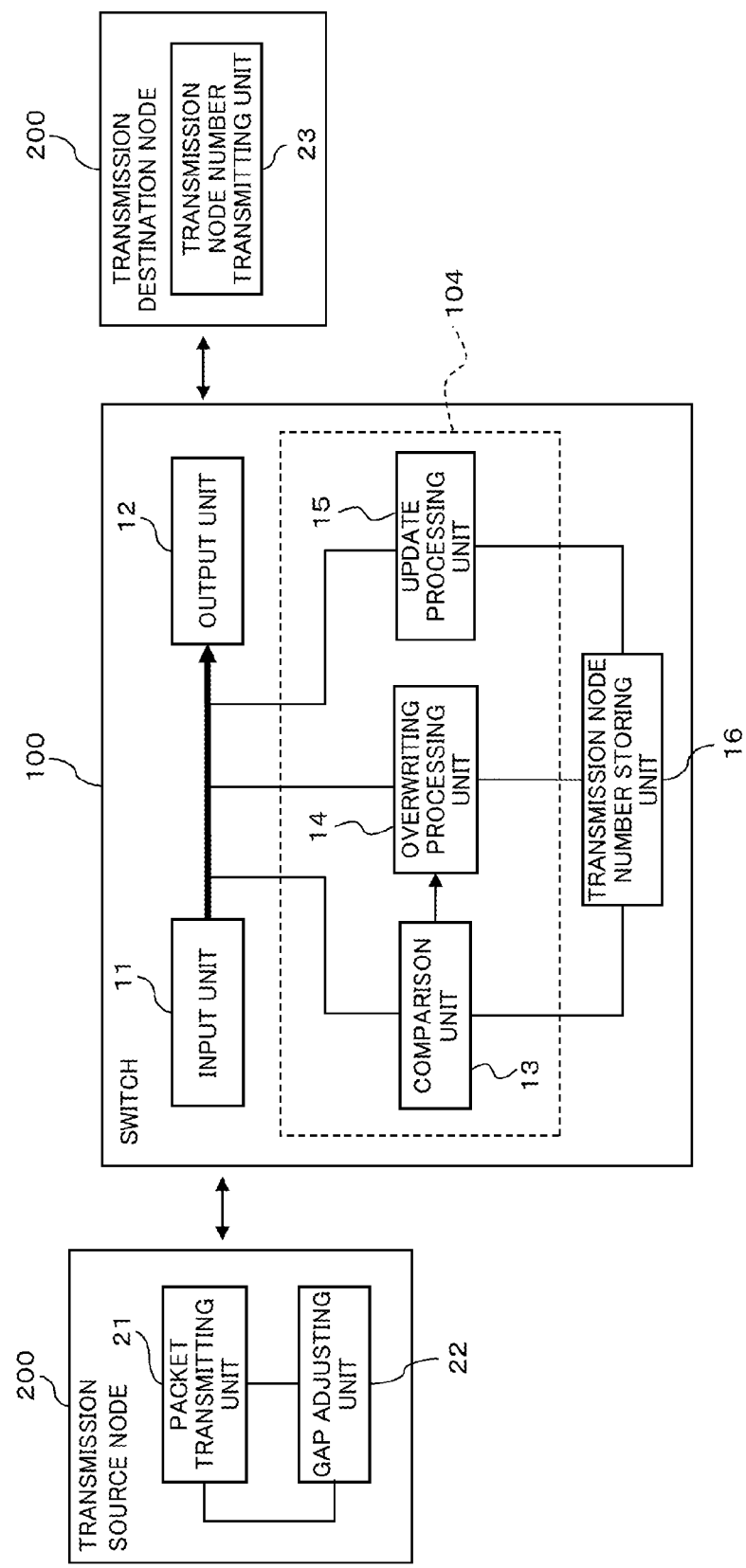
FIG. 1 is a diagram that schematically illustrates the functional configuration of a parallel computer system as an example of a first embodiment.
Figure 2:
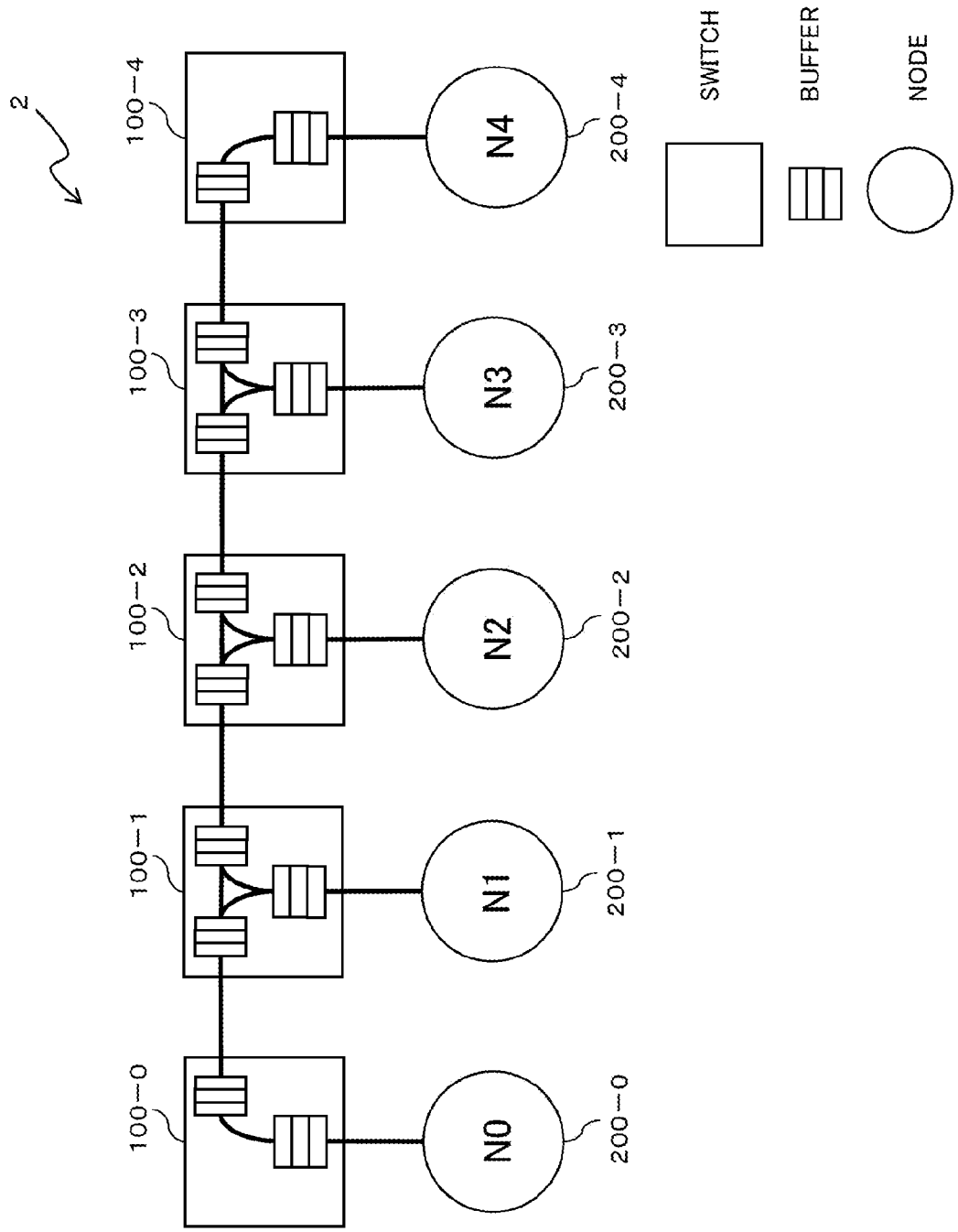
FIG. 2 is a diagram that schematically illustrates the configuration of the parallel computer system as the example of the first embodiment.

FIG. 1 is a diagram that schematically illustrates the functional configuration of a parallel computer system 1 as an example of a first embodiment, and FIG. 2 is a diagram that schematically illustrates the configuration thereof.

The parallel computer system 1, as illustrated in FIG. 2, is configured by an interconnected network in which a plurality of (five in the example illustrated in FIG. 2) computation nodes 200 are interconnected to be communicable with one another through one or more (five in the example illustrated in FIG. 2) routing devices (communication control devices) 100.

In other words, the parallel computer system 1 is configured by the interconnected network in which five computation nodes 200-0 to 200-4 are interconnected to be communicable with one another through five switches 100-0 to 100-4.

In the example illustrated in FIG. 2, a network 2 is formed as a one-dimensional mesh in which the routing devices 100-0 to 100-4 are arranged in the shape of a one-dimensional straight line, and the computation nodes 200-0 to 200-4 are respectively connected to the routing devices 100-0 to 100-4. In other words, the computation nodes 200-0, 200-1, 200-2, 200-3, and 200-4 are respectively connected to the routing devices 100-0, 100-1, 100-2, 100-3, and 100-4.

In this embodiment, a plurality of the computation nodes 200-0 to 200-4 included in the parallel computer system 1 have the same configuration, and a plurality of the routing devices 100-0 to 100-4 have the same configuration.

Hereinafter, as a reference sign that represents a routing device, while one of reference signs 100-0 to 100-4 will be used in a case where one of a plurality of the routing devices needs to be specified, reference sign 100 will be used in a case where an arbitrary routing device is to be represented. Similarly, hereinafter, as a reference sign that represents a computation node, while one of reference signs 200-0 to 200-4 will be used in a case where one of a plurality of the computation nodes needs to be specified, reference sign 200 will be used in a case where an arbitrary computation node is to be represented.

The computation nodes 200 are interconnected to be communicable with one another through the routing devices 100. Here, a part or the entirety of a network including the nodes 200 and the routing devices 100 may be simply referred to as the network 2. In FIG. 2, for the convenience of description, the configuration of only apart of the switch 100 is illustrated.

The computation node 200 is an information processing apparatus such as an arithmetic apparatus that performs arbitrary arithmetic processing. The computation node 200 includes constituent elements included in a general information processing apparatus, for example, a processor, a main storage device, and the like.

The computation node 200 is connected to the routing device 100 to be communicable with each other through a network interface 203. Accordingly, data can be transmitted and received between arbitrary computation nodes 200 within the parallel computer system 1. In other words, in the parallel computer system 1, any computation node 200 may serve either as a data transmission source or as a data transmission destination.

Here, a node of a side that requests communication in inter-node communication will be referred to as a local node, and a node of a side that receives a communication request from the local node in the inter-node communication will be referred to as a remote node.

Hereinafter, the computation node 200 of a data transmission source may be referred to as a local node, and the computation node 200 of a data transmission destination may be referred to as a remote node.

The computation node 200 as the transmission source node, as illustrated in FIG. 1, has functions as a packet transmitting unit 21 and a gap adjusting unit 22.

The packet transmitting unit 21 transmits a packet to the computation node 200 of the transmission destination. A packet transmitting unit 206 to be described later serves as this packet transmitting unit 21.

The gap adjusting unit (adjustment unit) 22 adjusts an interval (gap) between data to be transmitted based on a transmission node number transmitted from the transmission node number transmitting unit 23. A gap control unit 207 to be described later serves as this gap adjusting unit 22. Here, the gap is a section in which a packet is not transmitted.

In addition, the computation node 200 as a transmission destination node, as illustrated in FIG. 1, includes the transmission node number transmitting unit 23. This transmission node number transmitting unit 23 transmits a transmission node number read from a received packet to the computation node 200 of the transmission source. A packet receiving unit 208 and the packet transmitting unit 206 to be described later serve as this transmission node number transmitting unit 23.

Figure 3:
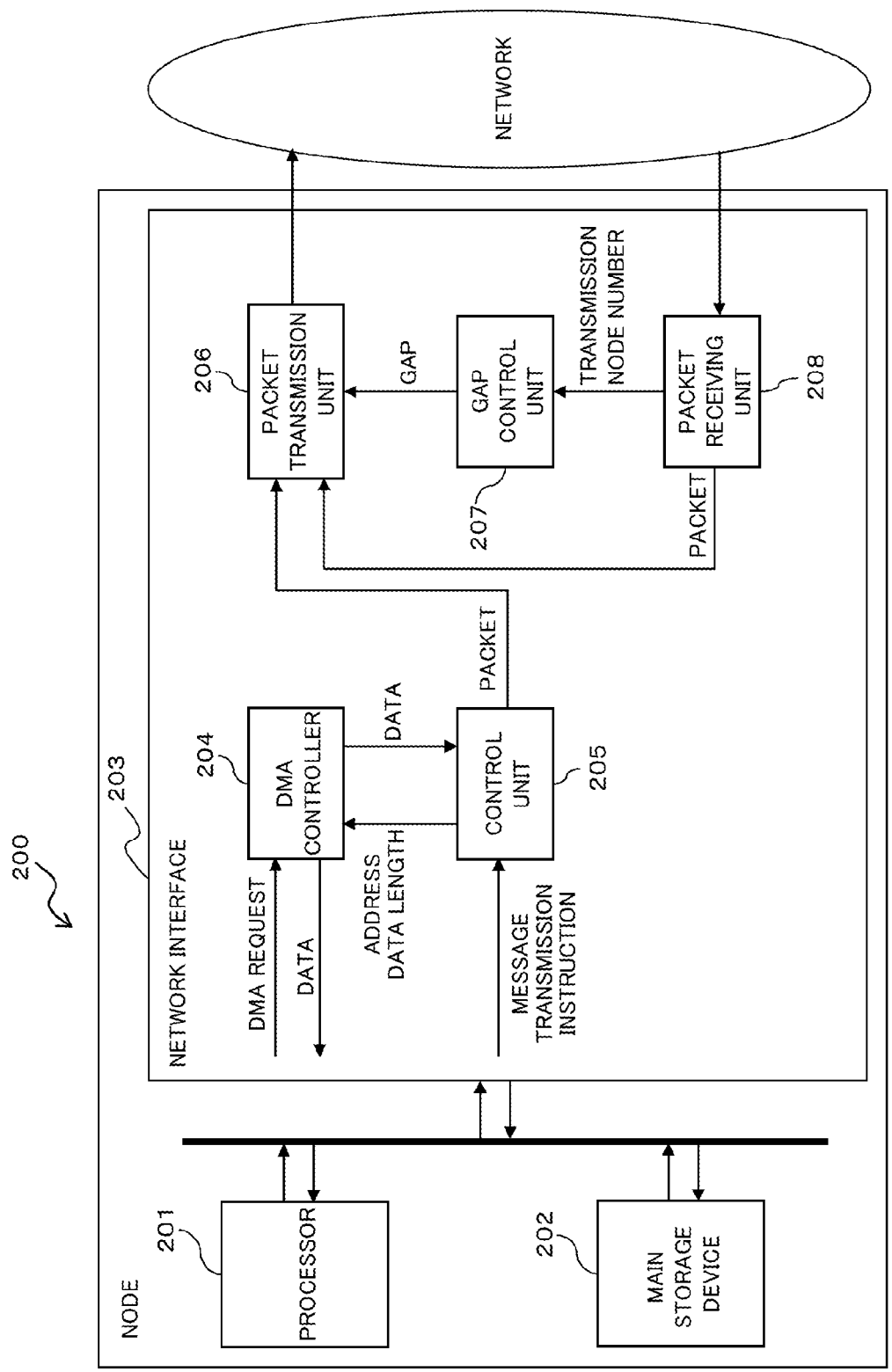
FIG. 3 is a diagram that schematically illustrates the configuration of a computation node of the parallel computer system as the example of the first embodiment.

FIG. 3 is a diagram that schematically illustrates the configuration of the computation node 200 of the parallel computer system 1 as the example of the first embodiment.

As illustrated in FIG. 3, the computation node 200 according to the first embodiment includes a processor 201, a main storage device 202, and the network interface 203.

In the parallel computer system 1, data transmitted from each node 200 is transmitted and received in a state being divided into packets. In addition, the length of this packet may be appropriately set and may be appropriately set as a fixed length or a variable length. Hereinafter, in this embodiment, an example will be described in which a packet has a fixed length.

The processor 201 is an arithmetic processing device that performs arithmetic processing in accordance with a predetermined program. The processor 201 sequentially acquires packets received by the network interface 203 and performs arithmetic processing. In addition, in a case where data needs to be transmitted to another computation node 200, the processor 201 generates packets each including a destination address by dividing the data and outputs the generated packets through the network interface 203.

When communication is performed between nodes, the processor 201 of the local node transmits a message transmission instruction to a control unit 205 of the network interface 203. In the message transmission instruction, for example, information such as a type of communication and the like is included.

The main storage device 202 is a memory that stores various kinds of data, programs, and the like. When the processor 201 performs the arithmetic processing, in the main storage device 202, a program executed by the processor 201 and data are temporarily stored and expanded. In the main storage device 202, a DMA (Direct Memory Access) circuit that realizes DMA transmission for transmitting data maintained by the main storage device 202 to the network interface 203 not through the processor 201 may be included.

The network interface 203 is an interface that is used for the computation node 200 to communicate with another computation node 200 through the network 2.

The network interface 203, as illustrated in FIG. 3, includes a DMA controller 204, the control unit 205, the packet transmitting unit 206, the gap control unit 207, and the packet receiving unit 208.

When being notified of the address of data to be accessed through the DMA access and the data length thereof from the control unit 205 to be described later, the DMA controller 204 makes a DMA request for the main storage device 202 while designating the address and the data length notified from the control unit 205. Then, the main storage device 202 performs DMA transmission of data of the designated data length stored at the designated address toward the DMA controller 204. The DMA controller 204 transmits the data that is transmitted through the DMA from the main storage device 202 to the packet transmitting unit 206.

When the packet transmission instruction is received from the processor 201, the control unit 205 performs packet transmitting and receiving processes by controlling the DMA controller 204, the packet transmitting unit 206, the packet receiving unit 208 and the like. In a case where the packet transmitting process is performed, the control unit 205 reads data to be transmitted by designating the data length of data included in one packet to the DMA controller 204 and the packet transmitting unit 206. In this embodiment, the length (size) of a packet that is transmitted from the computation node 200 is fixed.

When the data to be transmitted is received, the control unit 205 generates a packet (transmission packet) in which a header is added to the data and transmits the generated packet to the packet transmitting unit 206 so as to be transmitted to the network 2.

Figure 5:
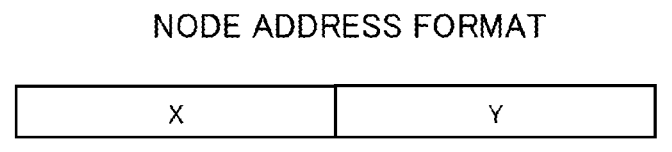
Figure 6:
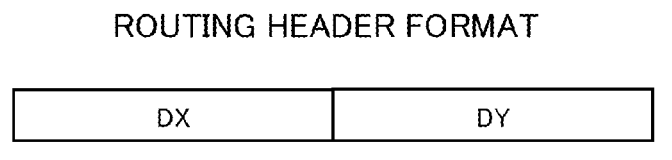

FIG. 4 is an exemplary diagram that schematically illustrates the format of the transmission packet in the parallel computer system 1 as the example of the first embodiment. FIG. 5 is an exemplary diagram that illustrates the formats of a local node address and a remote node address, and FIG. 6 is an exemplary diagram that illustrates the format of a routing header.

The transmission packet, for example, as illustrated in FIG. 4, includes fields in which a packet type, a routing header, a local node address, a remote node address, an offset, a transmission node number and a payload are respectively stored. The packet type is information that represents the type of the packet and, for example, represents a packet used for a Put request (Put communication) or a packet used for a Get request (Get communication).

Here, the Put communication represents a communication in which the local node designates areas of the main storage devices 202 of the local node and the remote node and writes data of the main storage device 202 of the local node into the area of the main storage device 202 of the remote node.

In addition, the Get communication represents a communication in which the local node designates areas of the main storage devices 202 of the local node and the remote node and writes data of the main storage device 202 of the remote node into the area of the main storage device 202 of the local node.

The local node address is information that represents the address (node address) of a transmission node number source node of the packet, and the remote node address is information that represents the address of a transmission destination node of the packet. Such node addresses, for example, are represented by coordinate values of each dimension.

In this embodiment, the network 2 includes a two-dimensional torus formed by X and Y or a mesh topology, and the node address, as illustrated in FIG. 5, is represented by coordinate values of X and Y.

The routing header is information that designates a route of the packet and, for example, is coordinate values representing the position of the remote node when the position of the transmission source node (local node) of the packet on the network 2 is set as the origin. This routing header, for example, is represented by coordinate values of each dimension.

In this embodiment, as described above, the network 2 includes the two-dimensional torus formed by X and Y or the mesh topology, and the routing header, as illustrated in FIG. 6, is represented by the coordinate values of DX and DY.

The routing device 100 determines a port that transmits the packet based on the information stored in the routing header.

The transmission node number is the number of the computation nodes 200 that are in the state of transmission of the packet in the network 2.

As will be described later, when the transmission packet passes through the routing device 100, this transmission node number is compared with a transmission node number maintained by the routing device 100. In a case where the transmission node number stored in the routing device 100 is larger than the transmission node number included in the transmission packet, the transmission node number of the packet is overwritten with the transmission node number stored in the routing device 100. In other words, the transmission node number included in the packet is updated by the routing device 100 when the packet is transmitted by the routing device 100.

As above, the transmission node number of a packet represents the number of the computation nodes 200 of the transmission source of the packet passing through a passage route of the packet. The transmission node number included in the packet is the same as a maximum value of the transmission node numbers stored in the routing devices 100 through which the packet passes.

The payload is data acquired by dividing a message (data source) transmitted from the transmission source node to the transmission destination node as is necessary. The offset is information that designates the address of the main storage device 202 storing the payload.

The packet receiving unit 208 performs a reception process in which a packet transmitted through the network 2 from another computation node 200 or the like is received, and the payload thereof is transmitted to processor 201.

In a state in which the computation node 200 has received a transmission packet, in other words, in a state in which the computation node 200 is the transmission destination node, the packet receiving unit 208 reads the transmission node number from the received packet and transmits the read transmission node number to the packet transmitting unit 206. In addition, in a state in which the computation node 200 has transmitted a transmission packet, in other words, in a state in which the computation node 200 is the transmission source node, the packet receiving unit 208 receives a response packet (to be described later) transmitted from the transmission destination node, reads a transmission node number included in this response packet, and transmits the read transmission node number to the gap control unit 207.

In a state in which the computation node 200 is the transmission source node, the packet transmitting unit 206 transmits the packet generated by the control unit 205 to the computation node 200 of the transmission destination.

On the other hand, in a state in which the computation node 200 is the transmission destination node, the packet transmitting unit 206 generates a response packet and transmits the generated response packet to the computation node 200 of the transmission source of the received packet.

FIG. 7 is an exemplary diagram that schematically illustrates the format of the response packet in the parallel computer system 1 as the example of the first embodiment.

This response packet, for example, as illustrated in FIG. 7, includes fields in which a packet type, a routing header, a local address, a remote address, and a transmission node number are respectively stored. The respective information stored in this response packet is the same as that included in the transmission packet described with reference to FIG. 4, and thus, detailed description thereof will not be presented.

As the transmission node number stored in the response packet, a value read from the packet (transmission packet) received by the packet receiving unit 208 is used.

The gap control unit 207 determines a transmission interval (gap length) between a plurality of packets transmitted from the packet transmitting unit 206 based on the transmission node number read from the response packet. More specifically, the gap control unit 207 determines the gap length to be inserted between the packets based on the following Equation (1).

$$\text{Gap Length} = \text{Packet Size} \times (\text{Transmission Node Number} - 1) \quad (1)$$

The gap control unit 207 inserts gaps of a length determined as described above between packets that are consecutively transmitted from the packet transmitting unit 206. More specifically, for example, by delaying the output timing of packets transmitted from the packet transmitting unit 206 by the calculated gap length, the gap of the length calculated as above is inserted between packets output from the packet transmitting unit 206. In a case where the packet length is variable, for example, a reference length set in advance may be considered to be used as the packet size, and the process can be modified and performed as is appropriate.

The routing device 100 is a communication control device (relay device) that is connected to the computation node 200 and the other routing devices 100 in a communicable manner and transmits a received packet (data) to a predetermined destination. As the routing device 100, for example, a switch is used. Hereinafter, the routing device 100 may be represented also as a switch 100.

Figure 8:
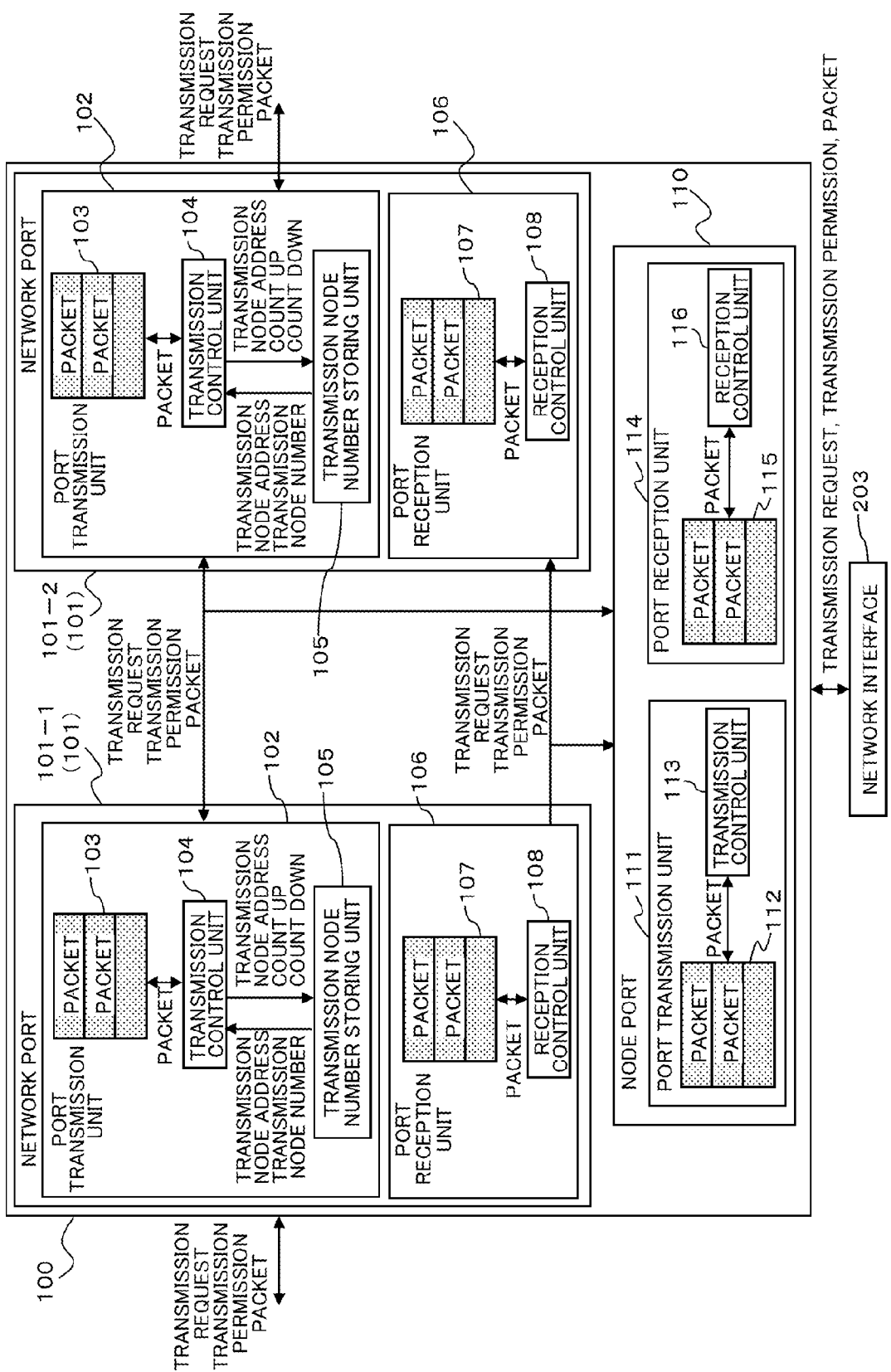
FIG. 8 is a diagram that schematically illustrates the format of a switch of the parallel computer system as the example of the first embodiment.

FIG. 8 is a diagram that schematically illustrates the format of the switch 100 of the parallel computer system 1 as the example of the first embodiment. The switch 100 illustrated in FIG. 8 as an example is a three-port switch 100 used in a one-dimensional mesh network and includes network ports 101-1 and 101-2 and a node port 110.

This switch 100, as illustrated in FIG. 1, has the functions of the input unit 11, the output unit 12, the comparison unit 13, the overwriting processing unit 14, the update processing unit 15, and the transmission node number storing unit 16.

The network ports 101-1 and 101-2 transmit/receive packets to/from the other switches 100 of the network 2. Such network ports 101-1 and 101-2 have the same configuration. Hereinafter, as a reference sign that represents a network port, while one of reference signs 101-1 and 101-2 will be used in a case where one of a plurality of the network ports needs to be specified, the reference sign 101 will be used in a case where an arbitrary network port is to be represented.

The network port 101, as illustrated in FIG. 8, includes a port transmission unit 102 and a port reception unit 106.

The port reception unit 106 receives packets transmitted from the other switches 100 connected thereto through the network 2. In other words, this port reception unit 106 corresponds to the input unit 11 to which transmitted packets are input.

This port reception unit 106 includes a buffer 107 and a reception control unit 108. The buffer 107 is a memory of FIFO (First In, First Out) type that stores packets transmitted from other switches 100 connected thereto.

The reception control unit 108 performs control for receiving packets transmitted from the other switches 100 and storing the received packets in the buffer 107. In addition, the reception control unit 108 also performs control for transmitting the packets stored in the buffer 107 to the network port 101 or the node port 110 that corresponds to the transmission destination of the packets.

This reception control unit 108 responses to the transmission request transmitted from another switch 100 with a transmission permission when a state in which packets can be stored in the buffer 107 is formed. Then, the reception control unit receives packets transmitted from the another switch 100 and stores the received packets in the buffer 107.

The reception control unit 108 determines the network port 101 or the computation node 200 of the transmission destination by referring to the routing header and the remote address of the received packets. Then, the reception control unit transmits a transmission request to the transmission control unit 104 of the port transmission unit 102 of the network port 101 or a transmission control unit 113 of a port transmission unit 111 of the node port 110 that has been determined. When the transmission permission is received from the transmission control unit 104 or the transmission control unit 113, the reception control unit 108 transmits the packets stored in the buffer 107 to the port transmission unit 102 of the network port 101 or the port transmission unit 111 of the node port 110.

The port transmission unit 102 transmits the packets to another switch 100 connected through the network 2.

In other words, this port transmission unit 102 corresponds to the output unit 12 that outputs packets to be transmitted. This port transmission unit 102 includes a buffer 103, a transmission control unit 104, and a transmission node number storing unit 105. The buffer 103 is a memory of the FIFO type that stores a packet to be transmitted to another switch 100 connected thereto.

The transmission control unit 104 performs control for transmitting a packet stored in the buffer 103 to another switch 100.

This transmission control unit 104 receives the packet to be transmitted to another switch 100 and the transmission request from the port reception unit 106 of another port transmission unit 102 and transmits the packet to another switch 100 in accordance with the transmission request. In transmitting the packet to another switch 100, the transmission control unit 104 transmits a transmission request to the switch 100. When a transmission permission is received from the switch 100, the transmission control unit transmits the packet stored in the buffer 103. In addition, the transmission control unit 104 receives a transmission request from the port reception unit 106 of another network port 101, and, when a state in which a packet can be stored in the buffer 103 is formed, transmits a transmission permission to the reception control unit 108 of the port reception unit 106.

Furthermore, the transmission control unit 104 extracts a remote node address (transmission node address) and a transmission node number from the packet stored in the buffer 103 and updates transmission state information of the transmission node number storing unit 105 based on such information. A technique for updating the transmission state information using the transmission control unit 104 will be described later in detail.

The transmission node number storing unit 105 manages the transmission state information that is information representing a transmission source node state relating to a packet passing through the switch 100 based on the packet passing through the switch 100. This transmission node number storing unit 105 is a storage unit such as a memory.

Figure 9:
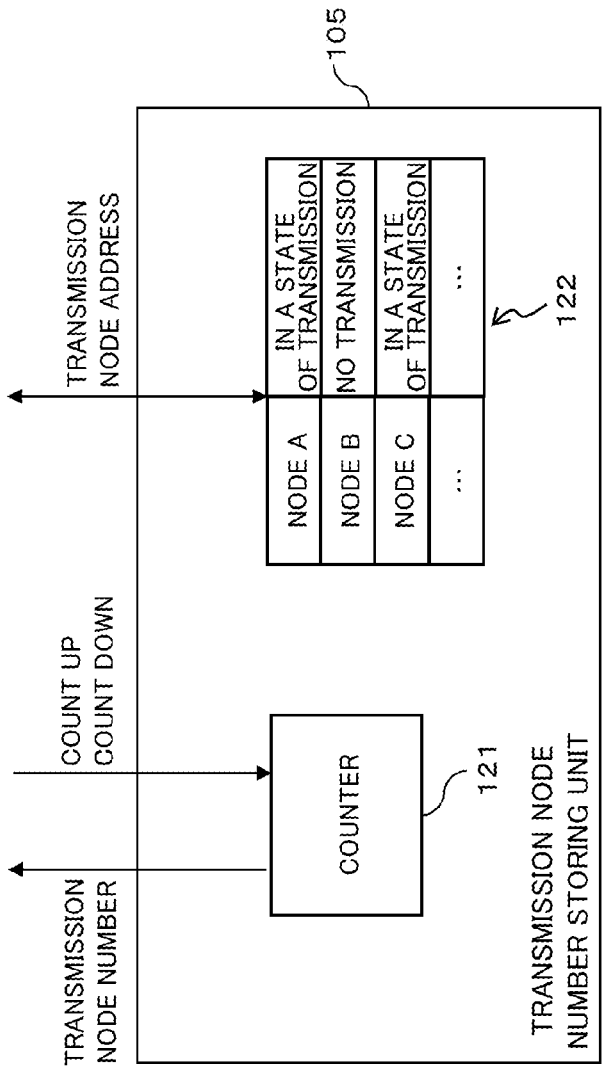
FIG. 9 is a diagram that schematically illustrates the functional configuration of a transmission node number storing unit of the parallel computer system as the example of the first embodiment.

FIG. 9 is a diagram that schematically illustrates the functional configuration of the transmission node number storing unit 105 of the parallel computer system 1 as the example of the first embodiment.

The transmission node number storing unit 105, as illustrated in FIG. 9, includes a counter 121 and a transmission node information storing unit 122.

The transmission node information storing unit 122, as illustrated in FIG. 9, is a storage unit that stores transmission node state information (transmission node information and transmission state information) in which information specifying a computation node 200 such as a node address and information representing whether or not the computation node 200 is in the state of transmitting a packet are associated with each other. As the information representing whether or not the computation node 200 is in the state of transmitting a packet, for example, information representing either "in the state of transmission" or "no transmission" is stored. The transmission node information storing unit 122, for example, is realized by a storage circuit such as a memory.

In the network port 101, when the transmission control unit 104 of the port transmission unit 102 transmits a packet to another switch 100, in the transmission node information storing unit 122, "in the state of transmission" is set in association with the transmission destination node of the packet.

The configuration of the network 2 is known to the parallel computer system 1 in advance. Accordingly, in the transmission node information storing unit 122, the computation node 200 that is the transmission source node of the packet passing through the switch 100 can be set in advance.

The counter 121 is a counter that counts the number (the transmission node number; the transmission state information) of the computation nodes 200 that are in the state of transmission of a packet passing through the switch 100 in the network 2. This counter 121 performs count-up or count-down of the count value in accordance with a count-up instruction or a count-down instruction given from the transmission control unit 104. More specifically, the counter performs count-up or count-down of the count value in accordance with a count-up signal or a count-down signal transmitted from the transmission control unit 104.

For example, the transmission control unit 104 causes the counter 121 to perform count-up by transmitting a count-up signal for giving a count-up instruction to the counter 121 when a packet is transmitted to another switch 100.

In addition, in this first embodiment, the transmission control unit 104 measures an elapse time after storage of the transmission node state information of the transmission source node in the transmission node number storing unit 105 using a timer or the like not illustrated in the figure. Then, for example, when it is detected that a predetermined time packet set in advance has not been transmitted from the transmission source node, the transmission control unit 104 sets "no transmission" to the transmission source node in the transmission node information storing unit 122. In addition, in a case where the counter 121 is included, the transmission control unit 104 performs count-down of the transmission node number by transmitting a count-down signal for giving a count-down instruction to the counter 121 at the same time.

In other words, when data is output from the output unit, the transmission control unit 104 serves as the update processing unit 15 that updates the transmission node number of the counter 121 in the transmission node number storing unit 105 and the information stored in the transmission node information storing unit 122.

Here, the value of the counter 121 is the same as the number of transmission source nodes that are stored as being "in the state of transmission" in the transmission node information storing unit 122. Accordingly, by counting the number of the transmission source nodes that are stored as being "in the state of transmission" in the transmission node information storing unit 122, the counter 121 may be omitted in the transmission node number storing unit 105.

Figure 10:
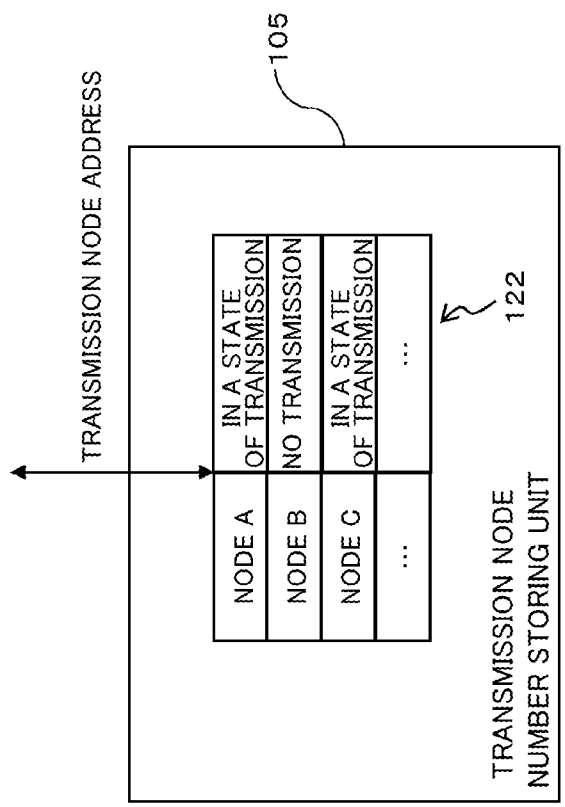
FIG. 10 is a diagram that illustrates a modified example of the transmission node number storing unit of the parallel computer system as the example of the first embodiment.

FIG. 10 is a diagram that illustrates a modified example of the transmission node number storing unit 105 of the parallel computer system 1 as the example of the first embodiment. The transmission node number storing unit 105 of the parallel computer system 1 as the example of the first embodiment illustrated in FIG. 10 is acquired by excluding the counter 121 from the transmission node number storing unit 105 according to the first embodiment and includes only the transmission node information storing unit 122.

In the switch 100 including the transmission node number storing unit 105 as this modified example, for example, the transmission control unit 104 acquires the transmission node number by counting the number of transmission source nodes that are stored as being "in the state of transmission" in the transmission node number storing unit 105. Accordingly, the device configuration is simplified by omitting the mounting of the counter 121 in the transmission node number storing unit 105, and the manufacturing cost can be reduced.

The transmission node number storing unit 105 corresponds to the transmission node number storing unit 16 that stores a transmission node number representing the number of computation nodes 200 that are in the state of transmission of data passing through the switch 100 in the network 2.

In addition, the transmission control unit 104, as illustrated in FIG. 1, has the functions of the comparison unit 13 and the overwriting processing unit 14.

The comparison unit 13 compares the transmission node number of a packet to be transmitted by the port transmission unit 102 of the network port 101 and the counter value of the counter 121 of the transmission node number storing unit 105 with each other.

As a result of the comparison made by the comparison unit 13, in a case where the counter value of the counter 121 is larger than the transmission node number of the packet to be transmitted, the overwriting processing unit 14 overwrites the transmission node number of the packet with the counter value of the counter 121.

In addition, as illustrated in FIG. 10, in a case where the transmission node number storing unit 105 does not include the counter 121, the comparison unit 13, instead of the counter value of the counter 121, uses the value acquired by counting the number of the transmission nodes that are "in the state of transmission" in the transmission node information storing unit 122.

The node port 110 is connected to the computation node 200 in a communicable manner and transmits/receives a packet to/from the connected computation node 200.

The node port 110, as illustrated in FIG. 8, includes the port transmission unit 111 and a port reception unit 114. The port transmission unit 111 transmits the packet received by the network port 101 of the switch 100 to the network interface 203 of the connected computation node 200.

The port transmission unit 111 transmits a packet to the network interface 203 of the connected computation node 200. In other words, this port transmission unit 111 corresponds to the output unit 12 that outputs a packet to be transmitted.

This port transmission unit 111 includes a buffer 112 and the transmission control unit 113. The buffer 112 is a memory of the FIFO type that stores packets to be transmitted to the network interface 203 of the connected computation node 200. The transmission control unit 113 performs control for transmitting the packets stored in the buffer 112 to the computation node 200.

This transmission control unit 113 receives a transmission request and packets from the network port 101 and transmits the packets to the computation node 200 in accordance with the transmission request. When packets are transmitted to the computation node 200, the transmission control unit 113 transmits a transmission request to the network interface 203. Then, when a response of a transmission permission is received from the network interface 203, the transmission control unit transmits the packets stored in the buffer 112 to the network interface 203. In addition, when a state in which a new packet can be stored in the buffer 112 is formed, the transmission control unit 113 transmits a transmission permission to the network port 101.

The port reception unit 114 receives packets transmitted from the network interface 203 of the computation node 200. In other words, this port reception unit 114 corresponds to the input unit 11 to which transmitted packets are input as well.

The port reception unit 114 includes a buffer 115 and a reception control unit 116. The buffer 115 is a memory of the FIFO type that stores packets received from the network interface 203 of the connected computation node 200. The reception control unit 116 performs control for receiving packets transmitted from the network interface 203 and storing the received packets in the buffer 115. In addition, the reception control unit 116 also performs control for transmitting the packets stored in the buffer 115 to the network port 101 that corresponds to the transmission destination of the packets.

This reception control unit 116 transmits a response of a transmission permission to the transmission request transmitted from the network interface 203 of the computation node 200 when a state is formed in which a packet can be stored in the buffer 115. Then, the reception control unit 116 receives the packets transmitted from the network interface 203 and stores the received packets in the buffer 115.

The reception control unit 116 determines the network port 101 of the transmission destination by referring to the routing header and the remote address of the received packets and transmits a transmission request to the transmission control unit 104 of the port transmission unit 102 of the network port 101. When the transmission permission is received from the network port 101, the reception control unit 116 transmits the packets stored in the buffer 115 to the port transmission unit 102 of the network port 101.

An overview of a technique for communicating packets in the parallel computer system 1 as the example of the first embodiment that is configured as above will be described with reference to FIGS. 11A, 11B, and 11C.

The parallel computer systems 1 illustrated in FIGS. 11A, 11B, and 11C have the same configuration as that illustrated in FIG. 2 and configure the network (interconnected network; communication network) 2 in which five computation nodes 200-0 to 200-4 are interconnected through five switches 100-0 to 100-4 to be communicable with one another. Hereinafter, the five computation nodes 200-0 to 200-4 may be represented as nodes N0 to N4. In addition, hereinafter, reference signs N0 to N4 specifying the computation nodes 200 may be referred to as node identification information.

In FIGS. 11A, 11B, and 11C, for the convenience of description, the configuration of only a part of the switch 100 is illustrated.

As described above, in the parallel computer system 1, when a packet is transmitted from the port transmission unit 102 of the network port 101, the switch 100 stores a transmission node address in the transmission node information storing unit 122 of the transmission node number storing unit 105.

FIGS. 11A, 11B, and 11C illustrate examples in which packets are transmitted from the nodes N0 and N3 to the node N4.

In such a state, as illustrated in FIG. 11A, an indication of "in the state of transmission" is stored for the node N0 that is the transmission source node in the transmission node information storing units 122 of the network ports 101 of the switches 100-0 to 100-2. In addition, an indication of "in the state of transmission" is stored for the nodes N0 and N3 that are the transmission source nodes in the transmission node information storing units 122 of the network ports 101 of the switches 100-3 and 100-4.

In FIGS. 11A, 11B, and 11C, for the convenience of description, only the node identification information of the computation node 200 that is "in the state of transmission" is represented in the transmission node information storing unit 122.

In addition, the transmission node number of a packet transmitted from the transmission source node is updated by the transmission control unit 104 at the time of passing through each switch 100. Accordingly, a maximum value of the transmission node numbers included in the switches 100 through which the packet has been passed is stored in the transmission node number of the packet. In the example illustrated in FIG. 11A, in a packet delivered to the node N4, a transmission node number "2" in the network 2 is stored.

The computation node 200 that has received the packet returns a response packet in which the transmission node number extracted from the received packet is stored to the computation node 200 of the transmission source of the packet. In the example illustrated in FIG. 11B, the node N4 returns a response packet in which a transmission node number of "2" is stored to the nodes N0 and N3.

In each one of the nodes N0 and N3 that have received the response packet, the gap control unit 207 calculates an interval between a plurality of packets to be transmitted based on Equation (1) described above, and the packet transmitting unit 206 inserts a gap of the calculated length (gap length) between the plurality of packets that are consecutively transmitted.

In the example illustrated in FIG. 11C, since the transmission node number is "2", the gap length of the gap inserted between packets=the packet size. In the nodes N0 and N3, the communication band (use band) that can be used for the transmission of a packet becomes a half, and accordingly, by inserting a gap of a length that is the same as the length of the packet between packets, the communication band of the network 2 can be used with high efficiency. In other words, the occurrence of congestion can be prevented, and the communication band can be equally used for the transmission source nodes.

In the parallel computer system 1, by repeating the above-described process thereafter, each transmission source node 200 dynamically adjusts a gap length of a gap inserted between packets to be transmitted in accordance with an increase/decrease in the transmission node number. For example, in a case where the node N2 transmits a packet to the node N4, the node N2 as the transmission source node is added as being "in the state of transmission" in the transmission node information storing units 122 of the ports of the switches 100-2 to 100-4 through which the packet passes.

In addition, the transmission node number stored in the packet is "3". Each one of the nodes N0, N2, and N3 that are the transmission source nodes inserts a gap of a length that is twice the length of the packet between packets to use the communication band equally based on Equation (1) described above.

Next, the process of the port reception unit 106 of the switch 100 of the parallel computer system 1 as the example of the first embodiment that is configured as described above will be described along a flowchart (Steps A10 to A60) represented in FIG. 12.

In this example, as illustrated in FIGS. 11A to 11C, the network 2 has a two-dimensional mesh configuration and performs dimension order routing in which coordinates are matched in order of X and Y as the routing.

In the switch 100, the port reception unit 106 of the network port 101 receives a packet from another switch 100 (Step A10). The port reception unit 106 updates the routing header of the packet based on the network port 101 that has received the packet. In other words, the routing header of the packet is updated by setting the value (DX, DY) of the routing header to either +1 or −1 in accordance with the dimension of the received network port 101.

More specifically, for example, the configuration of the network 2 is associated with the coordinate space, and a virtual origin is set. Then, for the position (coordinates) of the network port 101 of the switch 100 with respect to the origin, the increase direction of the coordinates is set as "+", and the decrease direction thereof is set as "−".

Then, the reception control unit 108, for the routing header of the packet, sets the value of DX or DY of the same dimension as that of the received network port 101 to −1 in a case where the network port is in the − direction and sets the value to +1 in a case where the network port 101 is in the + direction (Step A20). For example, in a case where the network port 101 is in the − direction in dimension X, the value of DX is set to −1. On the other hand, in a case where the network port 101 is in the + direction in dimension Y, the value of DY is set to +1.

The reception control unit 108 checks whether or not both values of DX and DY of the routing header are "0" (Step A30). In a case where both DX and DY are "0" (see the Yes route of Step A30), it represents that the packet arrives at the switch 100 to which the remote node of the destination is directly connected. Accordingly, the reception control unit 108 selects the node port 110 of the switch 100 having the packet to be connected to the network interface 203 (Step A40).

On the other hand, in a case where at least one of DX and DY is not "0" (non-zero) (see the No route of Step A30), for example, the non-zero field is checked in order of the X coordinate and the Y coordinate, and the network port 101 for which the value of the non-zero field is close to zero is selected (Step A60). In other words, a port that has the same dimension as that of the field and has the same sign as that of the field is selected. In a case where the dimension order routing is performed in order of the X coordinate and the Y coordinate, a non-zero field is checked in order of the Y coordinate and the X coordinate.

Then, the reception control unit 108 transmits a transmission request to the transmission control unit 113 or 104 of the node port 110 or the network port 101 that has been selected. When a transmission permission is transmitted as a response from the transmission control unit 113 or 104, the reception control unit 108 transmits a packet to the node port 110 or the network port 101 (Step A50).

In addition, when the packet is transmitted to another switch 100, the transmission control unit 104 of the port transmission unit 102 of the network port 101 that has received the packet updates the transmission node number storing unit 105. In other words, "in the state of transmission" is stored for the transmission node in the transmission node information storing unit 122, and count-up of the transmission node number of the counter 121 is performed.

Figure 13:
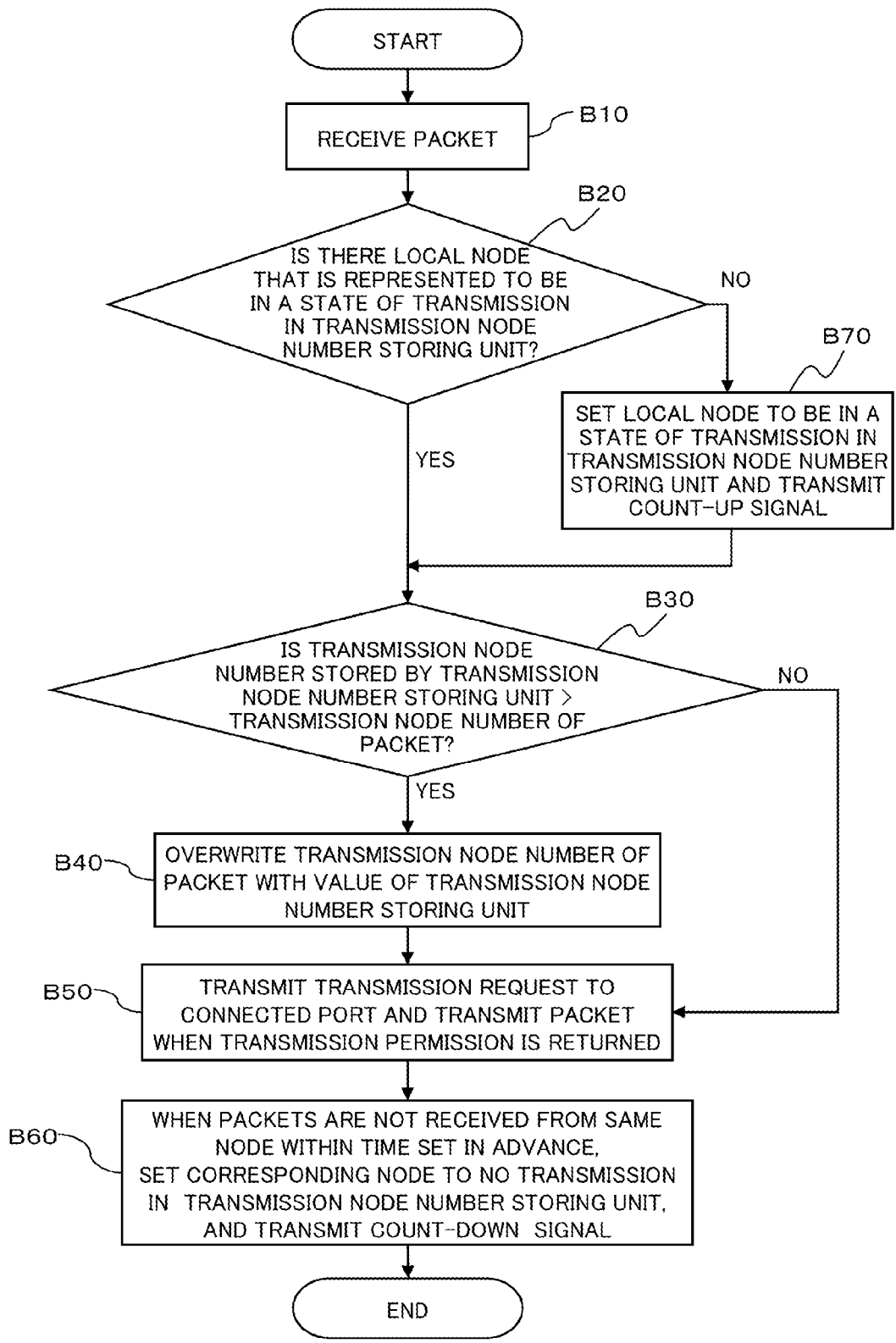
FIG. 13 is a flowchart that illustrates the process of a port transmission unit in the parallel computer system as the example of the first embodiment.

Next, the process of the port transmission unit 102 of the parallel computer system 1 as the example of the first embodiment will be described along a flowchart (Steps B10 to B70) represented in FIG. 13.

When a packet transmitted from the port reception unit 114 or the port reception unit 106 is received, the port transmission unit 102 stores the received packet in the buffer 103 (Step B10).

The transmission control unit 104 checks the transmission node information storing unit 122 based on the local node of the packet (Step B20). In other words, it is checked whether or not the local node is set to be "in the state of transmission" in the transmission node information storing unit 122.

In a case where the local node is set to be "in the state of transmission" in the transmission node information storing unit 122 (see the Yes route of Step B20), the transmission control unit 104 (comparison unit 13) compares the transmission node number managed by the transmission node number storing unit 105 and the transmission node number stored in the packet with each other (Step B30).

Here, in a case where the transmission node number storing unit 105 includes the counter 121 (see FIG. 9), the value of the counter is used as the transmission node number. On the other hand, in a case where the transmission node number storing unit 105 does not include the counter 121 (see FIG. 10), the transmission node number is acquired by counting nodes that are stored as being "in the state of transmission" in the transmission node information storing unit 122.

On the other hand, in a case where the local node is set as being in "no transmission" in the transmission node information storing unit 122 (see the No route of Step B20), the transmission control unit 104 sets "in the state of transmission" in association with the local node in the transmission node information storing unit 122. In addition, the transmission control unit 104 counts up (+1) the transmission node number by transmitting a count-up signal to the counter 121 (Step B70). Thereafter, the process proceeds to Step B30.

In a case where the transmission node number managed by the transmission node number storing unit 105 is the transmission node number of the packet or less (see the No route of Step B30), the transmission control unit 104 transmits a transmission request to the network port 101 of another switch 100 connected thereto. Then, when a transmission permission is received from the network port 101 as a response, the transmission control unit 104 transmits a packet to the corresponding network port 101 (Step B50).

In addition, in a case where the transmission node number managed by the transmission node number storing unit 105 is larger than the transmission node number of the packet (see the Yes route of Step B30), the transmission control unit 104 (overwriting processing unit 14) overwrites the value of the transmission node number of the packet with the transmission node number stored in the transmission node number storing unit 105 (Step B40). Thereafter, the process proceeds to Step B50.

The transmission control unit 104 measures an elapse time after the setting of "in the state of transmission" for the transmission source node in the transmission node information storing unit 122. Then, when a packet is not received from the same node for a time set in advance after the setting of "in the state of transmission" for the transmission node, the transmission control unit sets "no transmission" for the transmission source node in the transmission node information storing unit 122. In a case where the transmission node number storing unit 105 includes the counter 121 (see FIG. 9), the transmission control unit 104 counts down (−1) the transmission node number by transmitting a count-down signal to the counter 121 (Step B60). On the other hand, in a case where the transmission node number storing unit 105 does not include the counter 121 (see FIG. 10), the transmission control unit 104 does not transmit the count-down signal.

In this way, according to the parallel computer system 1 as the example of the first embodiment, the number (transmission node number) of the transmission source nodes that are in the state of transmitting the packet passing through a route from the transmission source node to the transmission destination node is stored in the transmission node number storing unit 105 by the switch 100 on the route. Then, the transmission source node calculates a transmission interval between packets that are consecutively transmitted based on the transmission node number.

More specifically, a gap of a length (gap length) calculated as "packet size×(transmission node number−1)" is inserted between packets.

This gap length is calculated based on the number of transmission source nodes that transmits packets on the communication route and corresponds to the amount of a decrease in the communication band that occurs in accordance with overlapping (polymerization) between packets that are transmitted on the communication route by a plurality of transmission source nodes. Accordingly, by setting the gap length based on the transmission node number, the transmission source nodes that are in the state of transmission of packets can evenly use the communication band.

According to the parallel computer system 1, the transmission source node can transmit packets at intervals matching the communication state of the packets on the communication route, whereby congestion can be resolved. In other words, congestion control matching the communication state on the communication route can be efficiently realized, and accordingly, the network 2 can be efficiently used in the parallel computer system 1.

Figure 14:
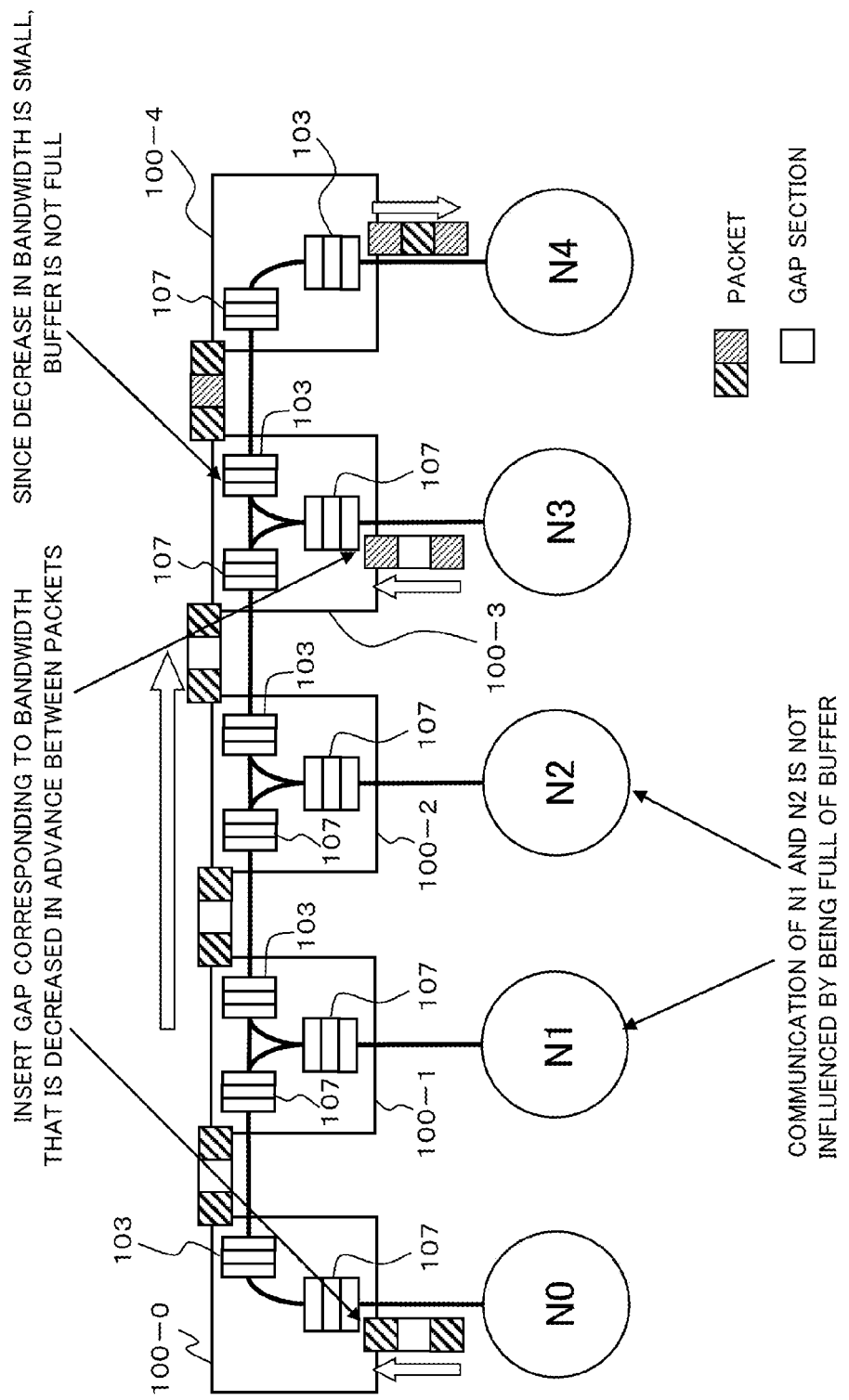
FIG. 14 is an exemplary diagram that illustrates the transmission state of packets in the parallel computer system as the example of the first embodiment.

FIG. 14 is an exemplary diagram that illustrates the transmission state of packets in the parallel computer system 1 as the example of the first embodiment. In the example illustrated in FIG. 14, nodes N0 and N3 transmit data to a node N4.

In the parallel computer system 1 according to this first embodiment, as illustrated in FIG. 14, when transmission source nodes transmit packets, a gap of a length corresponding to a communication band decreasing due to the transmission of the packets from a plurality of transmission source nodes is inserted between packets in advance.

In the example illustrated in FIG. 14, a packet transmitted from the node N0 and a packet transmitted from the node N3 overlap each other on the route from a switch 100-3 to the node N4. In this overlapping portion, the communication band that can be used respectively by the nodes N0 and N3 decrease to be a half.

Here, as nodes N0 and N3 that are the transmission source nodes of packets insert gaps of a length (gap length) that is the same as the length of the packet between packets that are consecutively transmitted, the communication band that is respectively used by the nodes N0 and N3 is set to be a half. Accordingly, in the overlapping portion of the switch 100-3 to the node N4, the communication band does not decrease, and buffer clogging does not occur. In other words, the occurrence of congestion is prevented, and the communication of the nodes N1 and N2 is not influenced by the clogging of the buffer.

In addition, in the parallel computer system 1, by storing the transmission node number in a packet, each switch 100 can acquire the transmission node number on the network 2 in an easy manner.

In the switch 100, the transmission node number is managed, and, at the time of transmitting a packet from the port transmission unit 102, the information (in the state of transmission) of the local node of the packet is stored in the transmission node number storing unit 105 (transmission node information storing unit 122). Accordingly, in the switch 100, the transmission source node that is in the state of transmission of the packet can be acquired in real time.

In the switch 100, the counter 121 is included in the transmission node number storing unit 105, and, by counting the transmission node number using the counter 121, the number of transmission source nodes that are in the state of transmission of packets can be acquired in real time in the switch 100.

In addition, in a case where a packet has not been transmitted for a predetermined time after the transmission node state information of the transmission source node is stored in the transmission node number storing unit 105, the transmission node number of the counter 121 is counted down. Accordingly, the value of the transmission node number is appropriately managed, whereby the reliability can be improved.

In the switch 100, when a packet is transmitted from the port transmission unit 102, the transmission node number managed by the transmission node number storing unit 105 (counter 121) and the transmission node number stored in the packet are compared with each other. Then, in a case where the transmission node number managed by the transmission node number storing unit 105 is larger than the transmission node number of the packet, the transmission node number of the packet is overwritten with the transmission node number managed by the transmission node number storing unit 105. Accordingly, the value of the transmission node number managed by each switch 100 can be reflected on the packet.

In addition, the transmission destination node extracts the transmission node number from a received packet, generates a response packet, and transmits the generated response packet to the transmission source node. Accordingly, the transmission source node can easily acquire the transmission node number and thus can calculate a gap length in accordance with Equation (1) described above by using the transmission node number read from the response packet.

(B) Modified Example of First Embodiment

In the first embodiment described above, while the example in which the local node transmits a message to the remote node as in the case of the Put communication or the like has been described, the present invention is not limited thereto. In other words, the present technology may be applied also to a case where the remote node transmits a message to the local node as in the case of the Get communication or the like.

Hereinafter, the process of the case where the remote node transmits a message to the local node as in the case of the Get communication or the like will be described.

(1) The local node transmits a Get request packet requesting for the transmission of a message to the remote node.

Here, as the format of this Get request packet, for example, a format acquired by excluding the transmission node number and the payload from the format of the transmission packet illustrated in FIG. 4 may be used.

Figure 12:
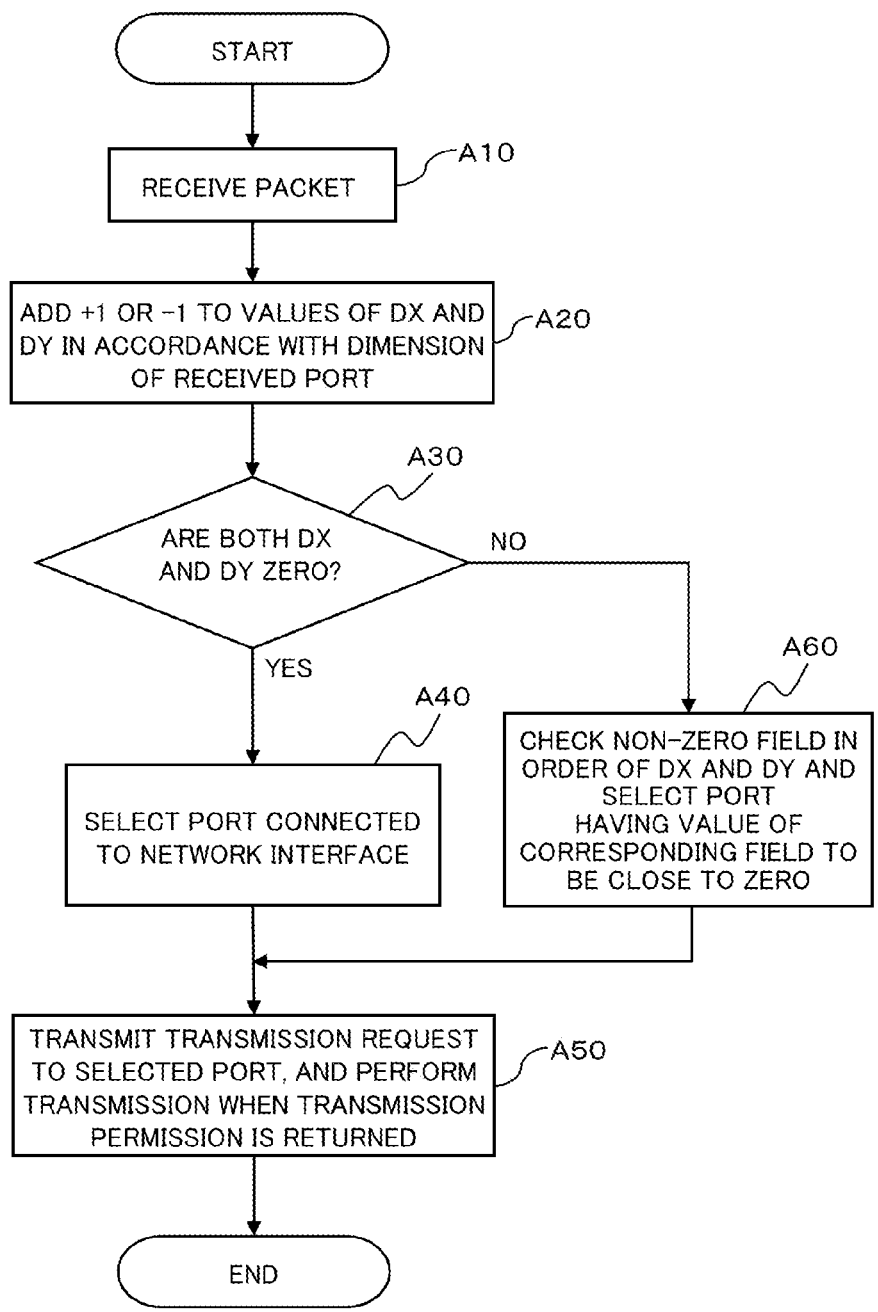
FIG. 12 is a flowchart that illustrates the process of a port reception unit of a switch in the parallel computer system as the example of the first embodiment.

(2) In the switch 100, the port reception unit 106 performs the dimension order routing that is based on the routing header by using a technique that is the same as that illustrated in the flowchart represented in FIG. 12, thereby transmitting a packet to the remote node. In addition, the port transmission unit 102 transmits the packet in accordance with the same process as the process of Steps B10 and B50 of the flowchart represented in FIG. 13. At this time point, the update process of updating the transmission node number storing unit 105 based on the transmission node number, which is illustrated in Steps B20 to B40 and B60 of the flowchart represented in FIG. 13, that is performed by the port transmission unit 102 is not performed.

(3) The network interface 203 of the remote node that has received the Get request packet reads requested data and returns a Get response packet to the local node.

As the format of this Get response packet, for example, the same format as that of the transmission packet illustrated in FIG. 4 may be used.

(4) In the switch 100, the port reception unit 106 performs the dimension order routing that is based on the routing header in accordance with the same process as that of the flowchart as represented in FIG. 12, thereby transmitting a packet to the local node. In addition, the port transmission unit 102 performs transmission of a packet, the update process of updating the transmission node number storing unit 105 based on the transmission node number, and the like in accordance with the same process as that of the flowchart represented in FIG. 13.

(5) The network interface 203 of the local node that has received the Get response packet stores the payload of the packet in the main storage device 202 and returns a response packet in which the transmission node number is stored to the remote node.

As the format of this response packet, for example, the format of the response packet illustrated in FIG. 7 may be used.

(6) The network interface 203 of the remote node that has received the packet calculates a gap length using Equation (1) described above, inserts gap of the gap length between Get response packets, and transmits resultant packets to the local node.

(C) Second Embodiment

In the parallel computer system 1 as the example of the first embodiment described above, when it is determined that a packet is not transmitted for a predetermined time set in advance from the transmission source node, the transmission control unit 104 sets "no transmission" for the transmission source node in the transmission node information storing unit 122. In addition, in a case where the counter 121 is included, the transmission control unit 104 counts down the transmission node number by transmitting a count-down signal to the counter 121 simultaneously with this.

In a parallel computer system 1 as an example of this second embodiment, the transmission control unit 104 of the port transmission unit 102 detects an end packet (tail packet) of a plurality of packets forming one message. Then, when this end packet is transmitted, the transmission control unit 104 sets "no transmission" for the transmission source node in the transmission node information storing unit 122. In addition, in a case where the counter 121 is included, the transmission control unit 104 counts down the transmission node number by transmitting a count-down signal to the counter 121 simultaneously with this.

More specifically, in the transmission source node, when a packet of a message is generated, the packet transmitting unit 206 sets information (end flag) that represents an end to the end packet of the message.

FIG. 15 is an exemplary diagram that schematically illustrates the format of the transmission packet in the parallel computer system 1 as the example of the second embodiment. The format of the transmission packet of the parallel computer system 1 as the example of this second embodiment has an end flag in addition to the format of the transmission format according to the first embodiment illustrated in FIG. 4. In addition, the other portion of the transmission packet is configured to be the same as that of the first embodiment, and the description thereof will not be presented.

Hereinafter, in the drawings, like reference signs denote like portions, and detailed description thereof will not be presented.

In the transmission source node, when a message is transmitted with being divided into a plurality of packets, the network interface 203 enables the end flag of the end packet. For example, "1" is set to the end flag. In addition, "0" is set to the end flags of packets other than the end packet. Such "1" of the end flag corresponds to end identification information that represents that the packet (divided data) is an end packet.

The setting of "0" or "1" to the end flag, for example, may be performed either by the control unit 205 or by the packet transmitting unit 206.

In the computation node 200 of the parallel computer system 1 as the example of the second embodiment, as described above, while "1" or "0" is set as the end flag of each packet to be transmitted in the network interface 203, the other portions are configured to be the same as those of the computation node 200 of the first embodiment, and the description thereof will not be presented.

In the switch 100, the transmission control unit 104 of the port transmission unit 102 updates the transmission node number storing unit 105 based on the end flag. In other words, the transmission control unit 104 checks the end flag of a packet to be transmitted and sets "no transmission" to the transmission source node in the transmission node information storing unit 122 when the packet in which "1" is set to the end flag is transmitted. In addition, simultaneously with this, in a case where the counter 121 is included in the transmission node number storing unit 105, the transmission control unit 104 counts down the transmission node number by transmitting a count-down signal to the counter 121.

In addition, in this second embodiment, the computation node 200 as the transmission destination node includes an end flag also in the response packet transmitted to the transmission source node. More specifically, an end flag is included in addition to the format of the response packet of the first embodiment illustrated in FIG. 7. The computation node 200 sets the end flag of the response packet as the value of the end flag read from a received packet and transmits the response packet as a response.

Figure 16:
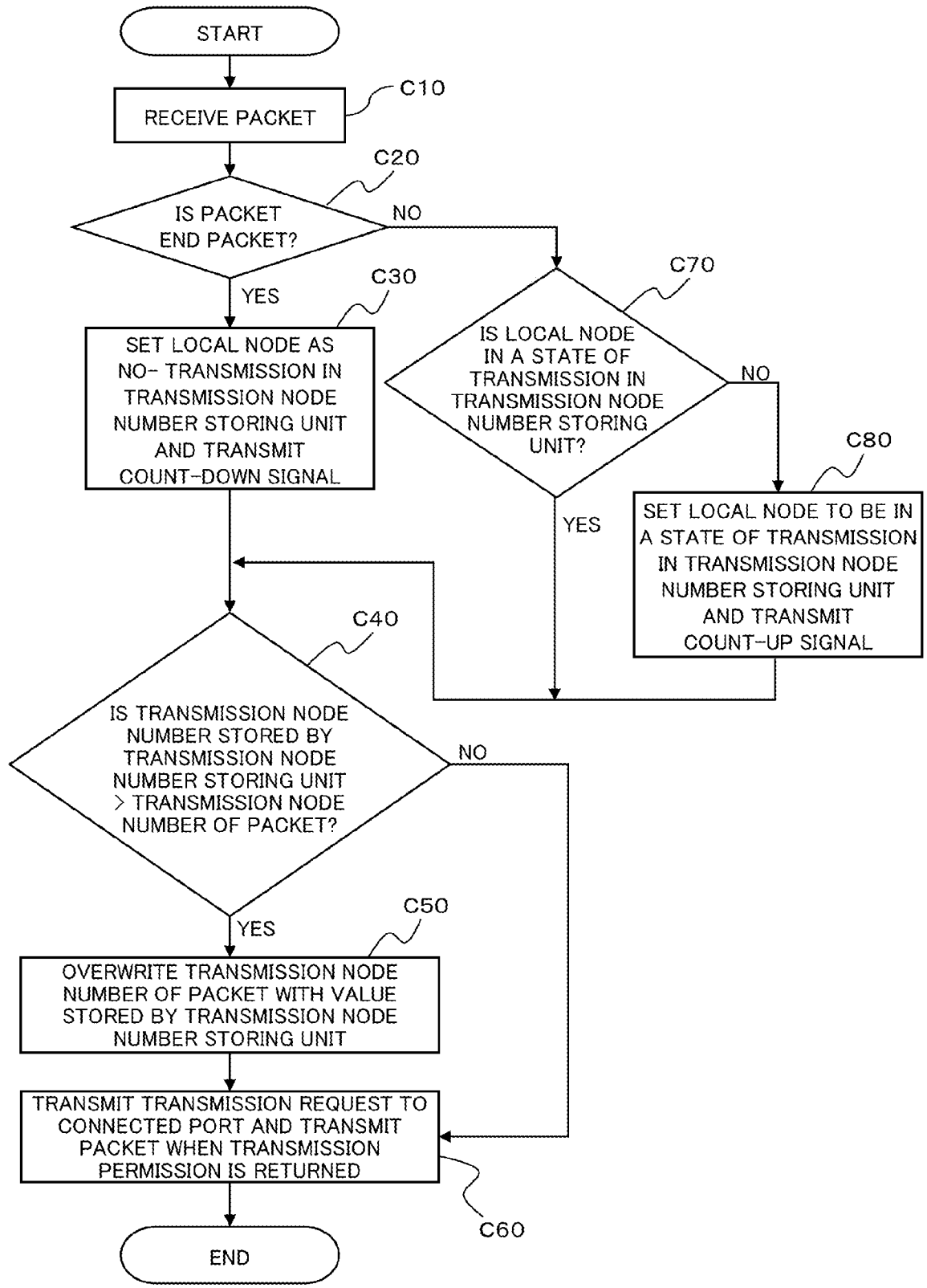
FIG. 16 is a flowchart that illustrates the process of a port transmission unit in the parallel computer system as the example of the second embodiment.

The process of the port transmission unit 102 of the parallel computer system 1 as the example of the second embodiment will be described along a flowchart (Steps C10 to C80) represented in FIG. 16.

When a packet transmitted from the port reception unit 114 or the port reception unit 106 is received, the port transmission unit 102 stores the received packet in the buffer 103 (Step C10).

The transmission control unit 104 checks whether or not the packet is an end packet of a plurality of packets configuring one message by checking the end flag of the packet (Step C20).

In a case where "1" is set to this end flag, in other words, in a case where the packet is an end packet (see the Yes route of Step C20), the transmission control unit 104 sets "no transmission" to the transmission source node in the transmission node information storing unit 122. In addition, in a case where the counter 121 is included in the transmission node number storing unit 105, the transmission control unit 104 counts down (−1) the transmission node number by transmitting a count-down signal to the counter 121 (Step C30). On the other hand, in a case where the counter 121 is not included, the process of this Step C30 may be omitted.

The transmission control unit 104 (comparison unit 13) compares the transmission node number managed by the transmission node number storing unit 105 and the transmission node number stored in the packet with each other (Step C40). As the transmission node number, in a case where the transmission node number storing unit 105 includes the counter 121 (see FIG. 9), similarly to the first embodiment, the value of the counter is used. On the other hand, in a case where the transmission node number storing unit 105 does not include the counter 121 (see FIG. 10), the transmission node number is acquired by counting nodes that are stored as being "in the state of transmission" in the transmission node information storing unit 122.

In a case where the transmission node number managed by the transmission node number storing unit 105 is the transmission node number of the packet or less (see the No route of Step C40), the transmission control unit 104 transmits a transmission request to the network port 101 of another switch 100 connected thereto. Then, when a transmission permission is received from the network port 101 as a response, the transmission control unit 104 transmits a packet to the corresponding network port 101 (Step C60).

In addition, in a case where the transmission node number managed by the transmission node number storing unit 105 is larger than the transmission node number of the packet (see the Yes route of Step C40), the transmission control unit 104 (overwriting processing unit 14) overwrites the value of the transmission node number of the packet with the transmission node number stored in the transmission node number storing unit 105 (Step C50). Thereafter, the process proceeds to Step C60.

On the other hand, in a case where "0" is set to the end flag, in other words, in a case where the packet is not an end packet (see the No route of Step C20), the transmission control unit 104 checks the transmission node information storing unit 122 based on the local node of the packet (Step C70).

In a case where the local node is set to be "in the state of transmission" in the transmission node information storing unit 122 (see the Yes route of Step C70), the process proceeds to Step C40. On the other hand, in a case where the local node is set as being in "no transmission" in the transmission node information storing unit 122 (see the No route of Step C70), the transmission control unit 104 sets "in the state of transmission" in association with the local node in the transmission node information storing unit 122. In addition, the transmission control unit 104 counts up (+1) the transmission node number by transmitting a count-up signal to the counter 121 (Step C80). Thereafter, the process proceeds to Step C40.

As above, according to the parallel computer system 1 as the example of the second embodiment, the same operations and advantages as those of the above-described first embodiment are acquired, and the transmission node number storing unit 105 is updated in a case where the transmission control unit 104 detects an end packet. In other words, by detecting the end packet, "no transmission" is set to the transmission source node in the transmission node information storing unit 122, and the count-down of the counter 121 is performed.

In other words, unlike the first embodiment, instead of waiting for the elapse of the predetermined time after the storage of the transmission node state information of the transmission source node in the transmission node number storing unit 105, the setting of "no transmission" to the transmission source node in the transmission node information storing unit 122 and the count-down of the counter 121 can be performed. Accordingly, the end of transmission of a group of packets for one message can be accurately checked in a speedy manner, and the end of the transmission of the packets can be instantly responded.

In other words, in the transmission source node, the communication state of the communication route can be quickly reflected on the calculation of the gap value of a gap inserted between packets that is performed by the gap adjusting unit 22, whereby the accuracy and the reliability can be improved.

(D) Third Embodiment

In the parallel computer system 1 as an example of each embodiment or a modified example thereof described above, the transmission control unit 104 updates the transmission node number storing unit 105 based on all the packets that are transmitted.

In a parallel computer system 1 as an example of a third embodiment, in the port transmission unit 102, the transmission control unit 104 compares the message length of the packet with a threshold set with each other in advance. Then, in a case where the message length is less than the threshold, the update of the transmission node number storing unit 105 for the packet is not performed. In other words, the setting of "in the state of transmission" or "no transmission" in the transmission node information storing unit 122 or the count-up of the counter 121 is not performed.

In other words, according to the third embodiment, in a case where the data size of the packet is less than the threshold, the transmission control unit 104 serves as an update suppressing unit that suppresses the update of the transmission node number.

FIG. 17 is an exemplary diagram that schematically illustrates the format of the transmission packet of the parallel computer system 1 as an example of the third embodiment. The format of the transmission packet of the parallel computer system 1 as the example of the third embodiment includes a message length in addition to the format of the transmission packet of the second embodiment illustrated in FIG. 15. The other portion of the transmission packet is configured to be the same as the format of the transmission packet in the second embodiment, and thus, the description thereof will not be presented.

In the transmission source node, when a message is transmitted with being divided into packets, the network interface 203 sets a message length that represents the length of the entire data of the message to each packet. This message length, for example, is transmitted from the processor 201 together with a message transmission instruction.

In the switch 100, the transmission control unit 104 of the port transmission unit 102 determines whether to update the transmission node number storing unit 105 based on the message length. In other words, when the packet is transmitted, the transmission control unit 104 compares the message length of the packet to be transmitted with a threshold set in advance. As a result of this comparison, in a case where the message length is less than the threshold, the packet is transmitted without the setting of "no transmission" or "in the state of transmission" for the packet in the transmission node information storing unit 122 or updating the counter 121. The other portion of the switch 100 is configured to be the same as the format of the transmission packet of the second embodiment, and thus, the description thereof will not be presented.

Figure 18:
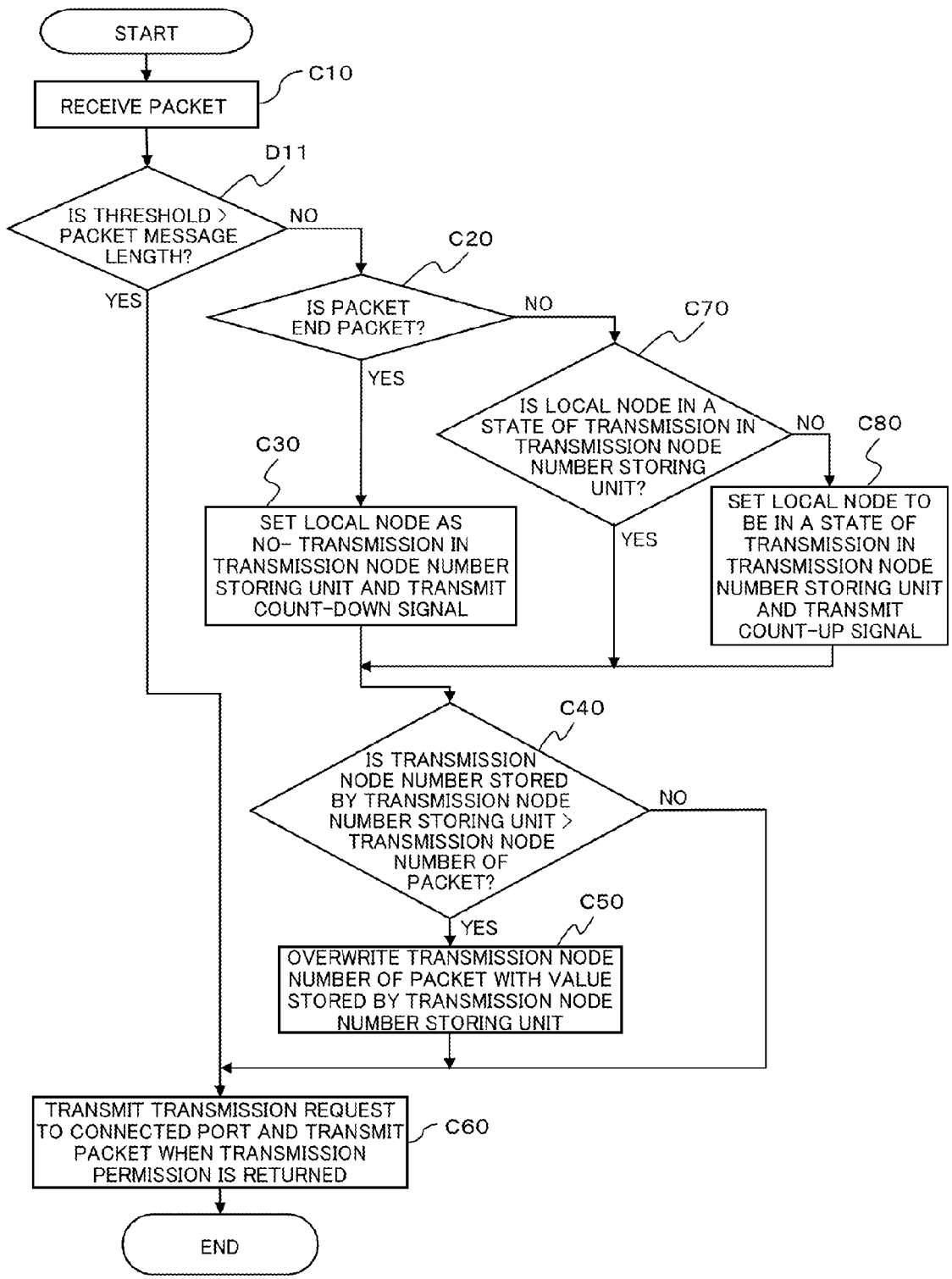
FIG. 18 is a flowchart that illustrates the process of a port transmission unit in the parallel computer system as the example of the third embodiment.

The process of the port transmission unit 102 of the parallel computer system 1 as the example of the third embodiment will be described along a flowchart (Steps C10, D11, and C20 to C80) represented in FIG. 18. Hereinafter, since each step to which the same reference sign as the reference sign described above represents the same process, the description thereof will not be presented.

When a packet transmitted from the port reception unit 114 or the port reception unit 106 is received, the port transmission unit 102 stores the received packet in the buffer 103 (Step C10).

The transmission control unit 104 checks whether or not the message length of the packet is less than a threshold set in advance (Step D11). As a result of this checking process, in a case where the message length of the packet is less than the threshold (see the Yes route of Step D11), the process proceeds to Step C60.

On the other hand, in a case where the message length of the packet is the threshold or more (see the No route of Step D11), the process proceeds to Step C20.

As above, according to the parallel computer system 1 as the example of the third embodiment, the same operations and advantages as those of the above-described second embodiment are acquired, and the count-up of the counter 121 or the registration of the transmission node information in the transmission node information storing unit 122 are not performed in a case where the message length of the packet is less than the threshold set in advance.

Accordingly, when another node is notified of an increase in the transmission node number, a short message of which the transmission has been completed is prevented from influencing the gap length set in the another computation node 200. In other words, an increase in the gap between transmitted packets according to the count-up of the transmission node number due to a short message in the transmission source node is prevented. Accordingly, the transmission of the message is prevented from being uselessly delayed, whereby the transmission efficiency of the packet is improved.

In addition, according to the parallel computer system 1 as the example of the third embodiment described above, the message length is included in the format of the transmission packet, and the switch 100 determines whether to update the transmission node number storing unit 105 based on the message length. In addition, while the example in which the other portion is configured to be the same as the format of the transmission packet of the second embodiment is illustrated, the present invention is not limited thereto. In other words, the other portion may have a configuration that is the same as that of the first embodiment or the modified example thereof.

(E) Fourth Embodiment

In the parallel computer system 1 as each embodiment and the modified example thereof described above, the example has been illustrated in which one packet transmitting unit 206 is included in the computation node 200. In this fourth embodiment, the computation node 200 includes a plurality of packet transmitting units 206, and, by transmitting packets of messages from the plurality of packet transmitting units 206, a plurality of messages can be transmitted at the same time.

Figure 19:
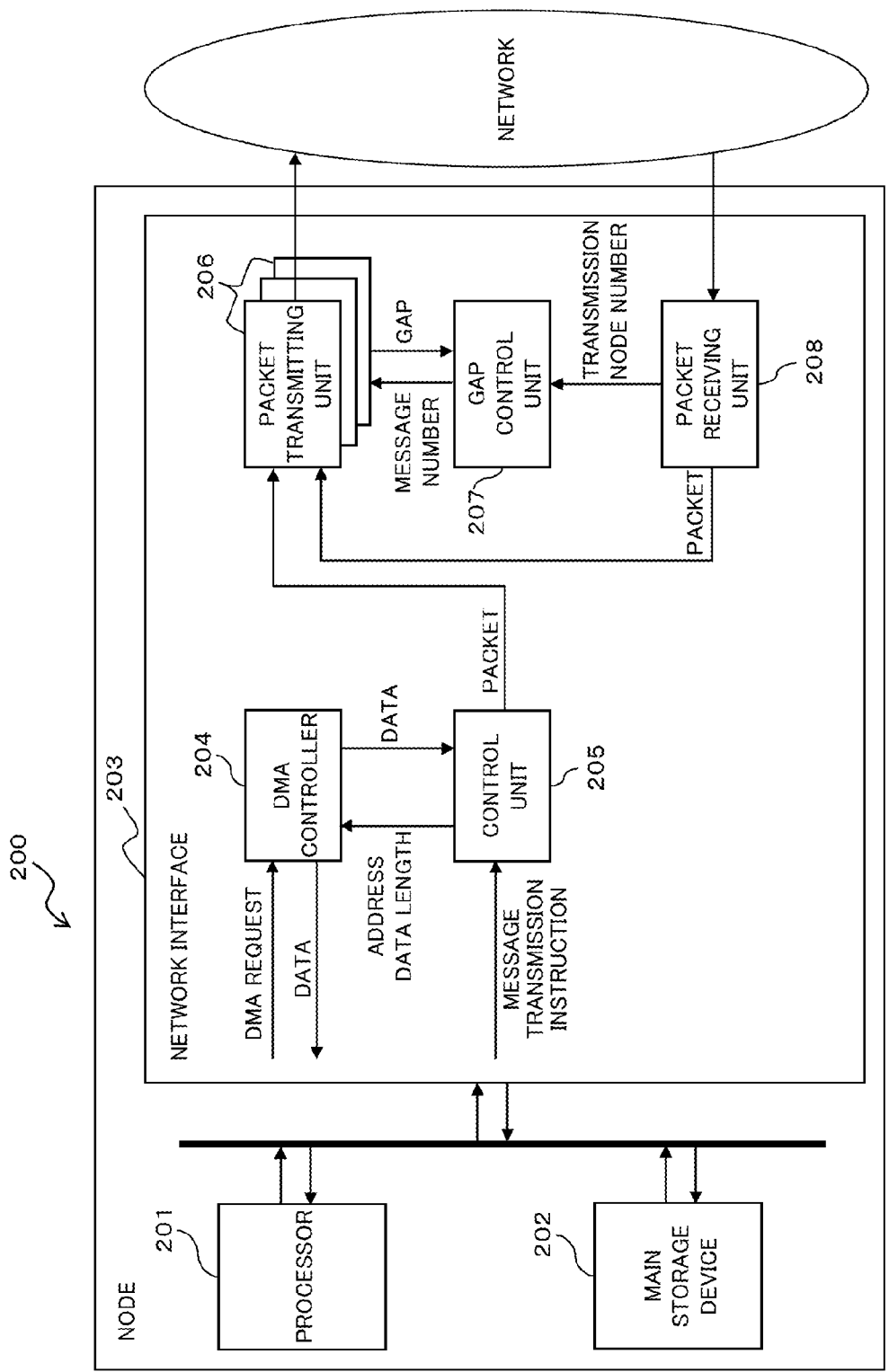
FIG. 19 is a diagram that schematically illustrates the configuration of a computation node of a parallel computer system as an example of a fourth embodiment.

FIG. 19 is a diagram that schematically illustrates the configuration of the computation node 200 of the parallel computer system 1 as an example of the fourth embodiment.

As illustrated in this FIG. 19, in this fourth embodiment, the computation node 200 includes the plurality of packet transmitting units 206. In addition, each packet transmitting unit 206 has a function of adding a message number (message identification information), which specifies a message corresponding to a packet, to the packet.

FIG. 20 is an exemplary diagram that schematically illustrates the format of the transmission packet in the parallel computer system 1 as the example of the fourth embodiment. The format of the transmission packet in the parallel computer system 1 as the example of the fourth embodiment includes a message number in addition to the format of the transmission packet of the second embodiment that is illustrated in FIG. 15.

In a case where the computation node 200 that is a transmission source node transmits a plurality of messages at the same time, the network interface 203 transmits the messages with numbers added thereto such that the plurality of messages transmitted at the same time can be respectively identified.

When the packet transmitted from the transmission source node is received, the computation node 200 that is the transmission destination node adds a message number that is added to the received packet to a response packet to be responded to the transmission source node and transmits the resultant response packet. As the format of the response packet, for example, a format acquired by adding the message number to the format of the response packet of the first embodiment illustrated in FIG. 7 may be used.

As a method of attaching the message number, for example, a message number starts from "0" and is counted up (+1) every time a message transmission instruction is arrived. In addition, when a response packet corresponding to an end packet of one message is received from the transmission destination node, the transmission source node reassigns the message number attached to this response packet to a message that is transmitted next. Accordingly, the message numbers can be efficiently operated.

The portion of the transmission packet other than the message number is the same as the format of the transmission packet of the second embodiment, and thus, the description thereof will not be presented.

In the transmission source node, when the message is transmitted with being divided into packets, the network interface 203 sets a message number identifying the message to each packet.

Figure 21:
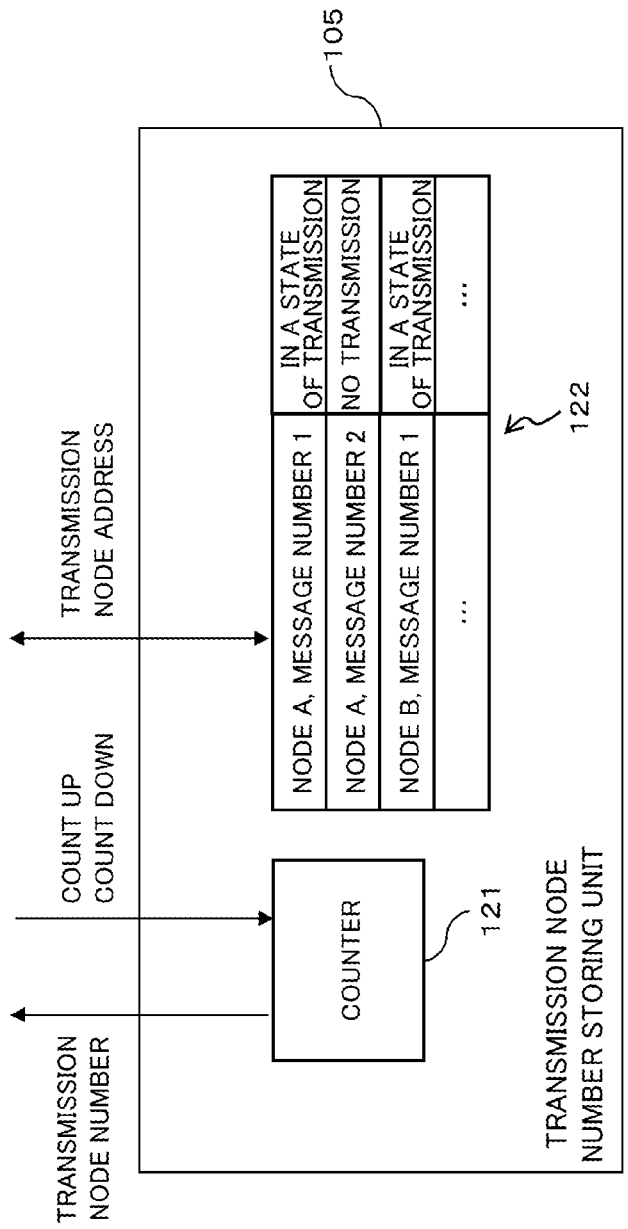
FIG. 21 is a diagram that schematically illustrates the functional configuration of a transmission node number storing unit of the parallel computer system as the example of the fourth embodiment.

FIG. 21 is a diagram that schematically illustrates the functional configuration of the transmission node number storing unit 105 of the parallel computer system 1 as the example of the fourth embodiment. This transmission node number storing unit 105 includes a counter 121 and a transmission node information storing unit 122.

In the parallel computer system 1 according to this fourth embodiment, the transmission node information storing unit 122, as illustrated in FIG. 21, with a combination of information specifying a transmission source node such as a node address and a message number, information that represents either "in the state of transmission" or "no transmission", which represents whether or not a packet corresponding to the combination is transmitted, is associated.

In other words, in the fourth embodiment, packets, which are transmitted from the same transmission source node, having mutually different message numbers are handled as mutually different transmission node numbers. In other words, in the port transmission unit 102 of the switch 100, packets, which are transmitted from the same transmission source node, having mutually different message numbers are counted as mutually different transmission source node numbers.

In addition, when packets are transmitted, the transmission control unit 104 counts up individual counters 121 in a case where packets, which are transmitted from the same transmission source node, having mutually-different message numbers are transmitted.

The reason for this is that, in a case where a plurality of messages are transmitted from the same transmission source node at the same time, when the transmission route of such messages overlap each other, a decrease in the band occurs between such messages as in a case where a decrease in the band occurs due to mutual overlapping (polymerization) of messages transmitted from mutually different transmission source nodes.

FIG. 22 is an exemplary diagram that schematically illustrates the format of the response packet in the parallel computer system 1 as the example of the fourth embodiment.

This response packet, for example, as illustrated in FIG. 22, includes a message number and an end flag in addition to the response packet illustrated in FIG. 7. Information stored in this response packet other than the message number is the same as the above-described information included in the packet described with reference to FIG. 7 and the like, and thus, the detailed description thereof will not be presented.

As the message number stored in this response packet, a value read from the packet (transmission packet) received by the packet receiving unit 208 is used.

When the packet is received, the transmission destination node notifies the transmission source node of the end flag and the message number together with the transmission node number by transmitting a response packet of the reception of a packet to the transmission source node.

In the transmission source node, a gap length is calculated using Equation (1) described above based on the transmission node number attached to the response packet. In other words, the gap length is calculated based on the transmission node number acquired by counting packets, which are transmitted from the same transmission source node, having mutually different message numbers as different transmission source node numbers.

In the transmission source node, a space of the gap length calculated as above is inserted between packets that are consecutively transmitted. Accordingly, packets are transmitted in accordance with a gap length corresponding to a decrease in the communication band that occurs due to a plurality of messages transmitted from the same transmission source node, and therefore, the occurrence of congestion can be prevented.

Figure 23:
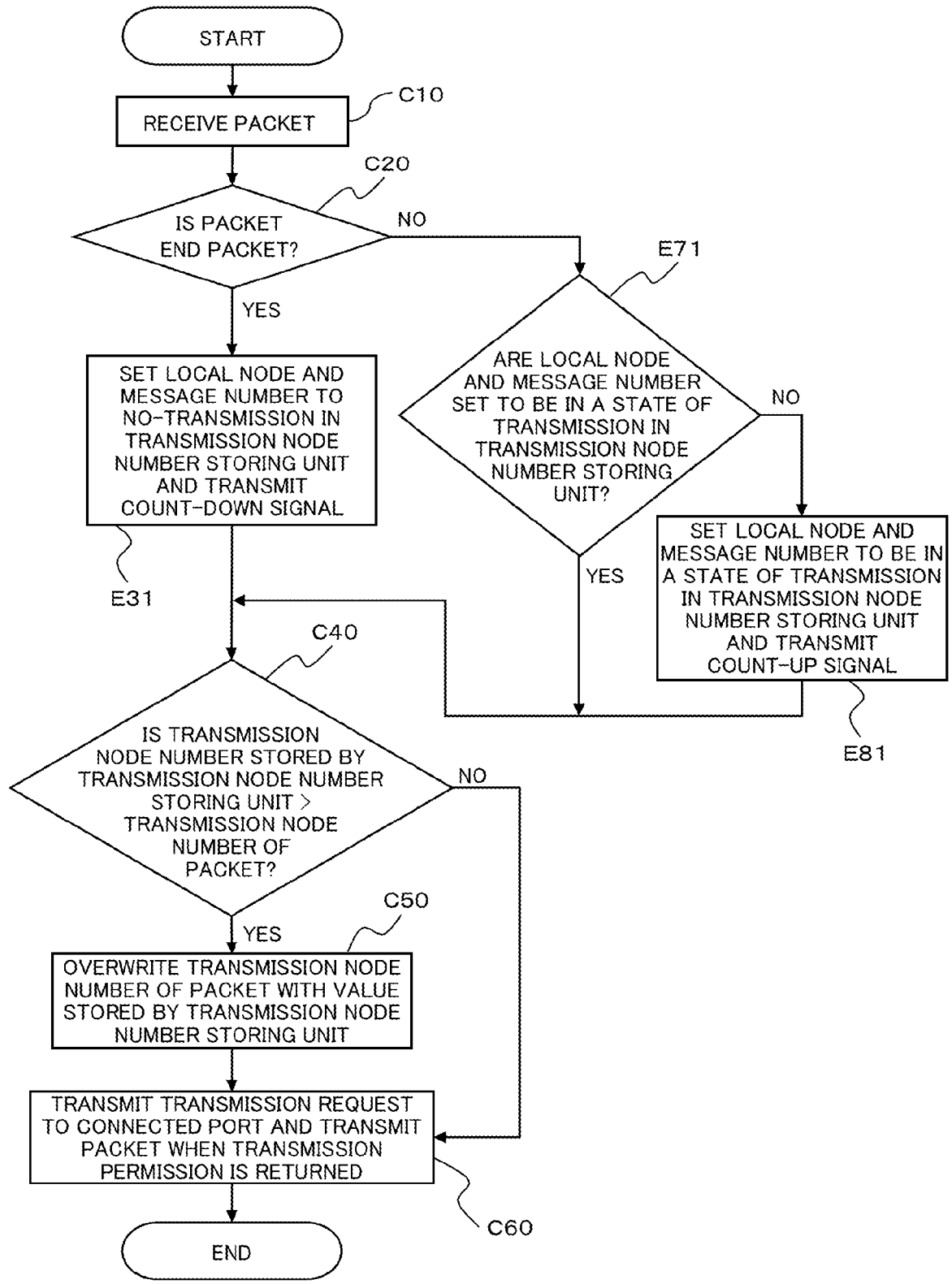
FIG. 23 is a flowchart that illustrates the process of a port transmission unit in the parallel computer system as the example of the fourth embodiment.

The process of the port transmission unit 102 of the parallel computer system 1 as the example of the fourth embodiment will be described along a flowchart (Steps C10, C20, E31, C40 to C60, E71, and E81) represented in FIG. 23. Hereinafter, since each step to which the same reference sign as the reference sign described above represents the same process, the description thereof will not be presented.

When a packet transmitted from the port reception unit 114 or the port reception unit 106 is received, the port transmission unit 102 stores the received packet in the buffer 103 (Step C10).

The transmission control unit 104 checks whether or not the packet is an end packet of a plurality of packets configuring one message by checking the end flag of the packet (Step C20).

In a case where "1" is set to this end flag, in other words, in a case where the packet is an end packet (see the Yes route of Step C20), the transmission control unit 104 sets "no transmission" in association with the combination of the transmission source node and the corresponding message number in the transmission node information storing unit 122. In addition, in a case where the counter 121 is included in the transmission node number storing unit 105, the transmission control unit 104 causes the counter 121 to counts down (+1) the transmission node number (Step E31) by transmitting a count-down signal to the counter 121, and the process proceeds to Step C40.

On the other hand, in a case where "0" is set to the end flag, in other words, in a case where the packet is not an end packet (see the No route of Step C20), the transmission control unit 104 checks the transmission node information storing unit 122 based on the local node and the message number of the packet (Step E71).

In a case where the combination of the local node and the corresponding message number is set to be "in the state of transmission" in the transmission node information storing unit 122 (see the Yes route of Step E71), the process proceeds to Step C40. On the other hand, in a case where the combination of the local node and the corresponding message number is as being in "no transmission" in the transmission node information storing unit 122 (see the No route of Step E71), the transmission control unit 104 sets "in the state of transmission" in association with the combination of the local node and the corresponding message number in the transmission node information storing unit 122. In addition, the transmission control unit 104 counts up (+1) the transmission node number by transmitting a count-up signal to the counter 121 (Step E81). Thereafter, the process proceeds to Step C40.

As above, according to the parallel computer system 1 as the example of the fourth embodiment, the same operations and advantages as those of the above-described second embodiment are acquired, and an appropriate gap can be inserted between packets even when a plurality of messages are transmitted from the computation node 200 of the transmission source at the same time. In other words, packets, which are transmitted from the same transmission source node, having mutually different message numbers are handled as mutually different transmission node numbers as a transmission source number. In other words, in the port transmission unit 102 of the switch 100, packets, which are transmitted from the same transmission source node, having mutually different message numbers are counted as mutually different transmission source node numbers as a transmission source number.

Accordingly, in a transmission source node, a gap length corresponding to a decrease in the communication band that occurs due to a plurality of messages transmitted from the same transmission source node is acquired, and packets are transmitted at an optimal interval. Therefore, the occurrence of congestion can be prevented.

In the fourth embodiment, as illustrated in FIG. 19, while the network interface 203 of the computation node 200 includes a plurality of packet transmitting units 206, the present invention is not limited thereto. Thus, various modifications may be made in a range not departing from the concept of the embodiment. For example, one computation node 200 may include a plurality of network interfaces 203. In such a case, instead of the message number, unique identification information (for example, a network interface number) is set for each network interface 203. Then, in the transmission node information storing unit 122, information of "in the state of transmission" or "no-transmission" is set in association with a combination of the local node and the network interface number by using the network interface number instead of the message number. Accordingly, implementation can be made similar to the fourth embodiment.

(F) Fifth Embodiment

For example, while the parallel computer system 1 according to the first embodiment illustrated in FIG. 2 as an example has a one-dimensional mesh network configuration in which a plurality of the switches 100 are arranged in a one-dimensional line pattern, the present invention is not limited thereto. In other words, the parallel computer system 1 may have a multi-dimensional network configuration.

Figure 24:
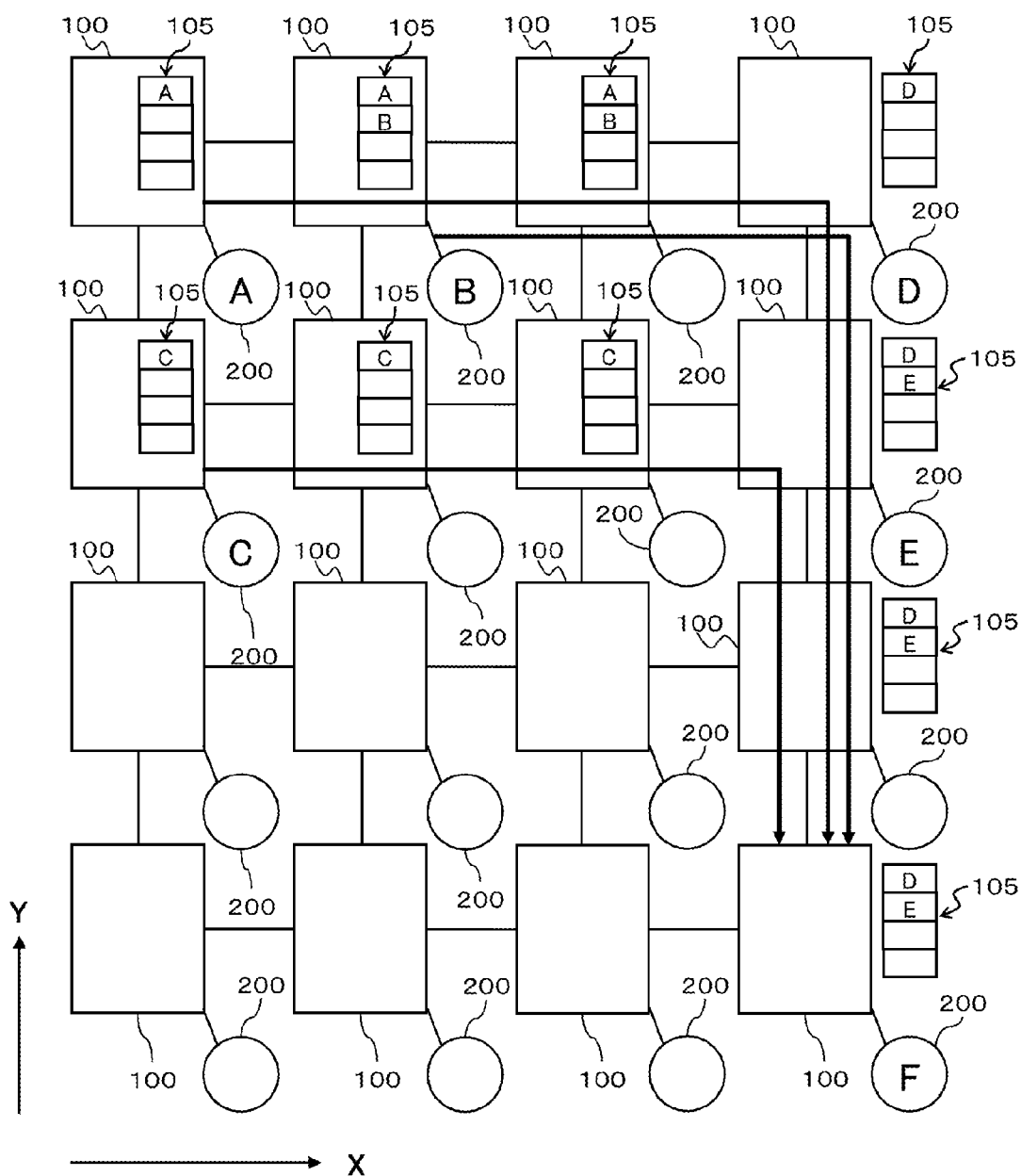
FIG. 24 is a diagram that schematically illustrates the configuration of a parallel computer system as an example of a fifth embodiment.
Figure 25:
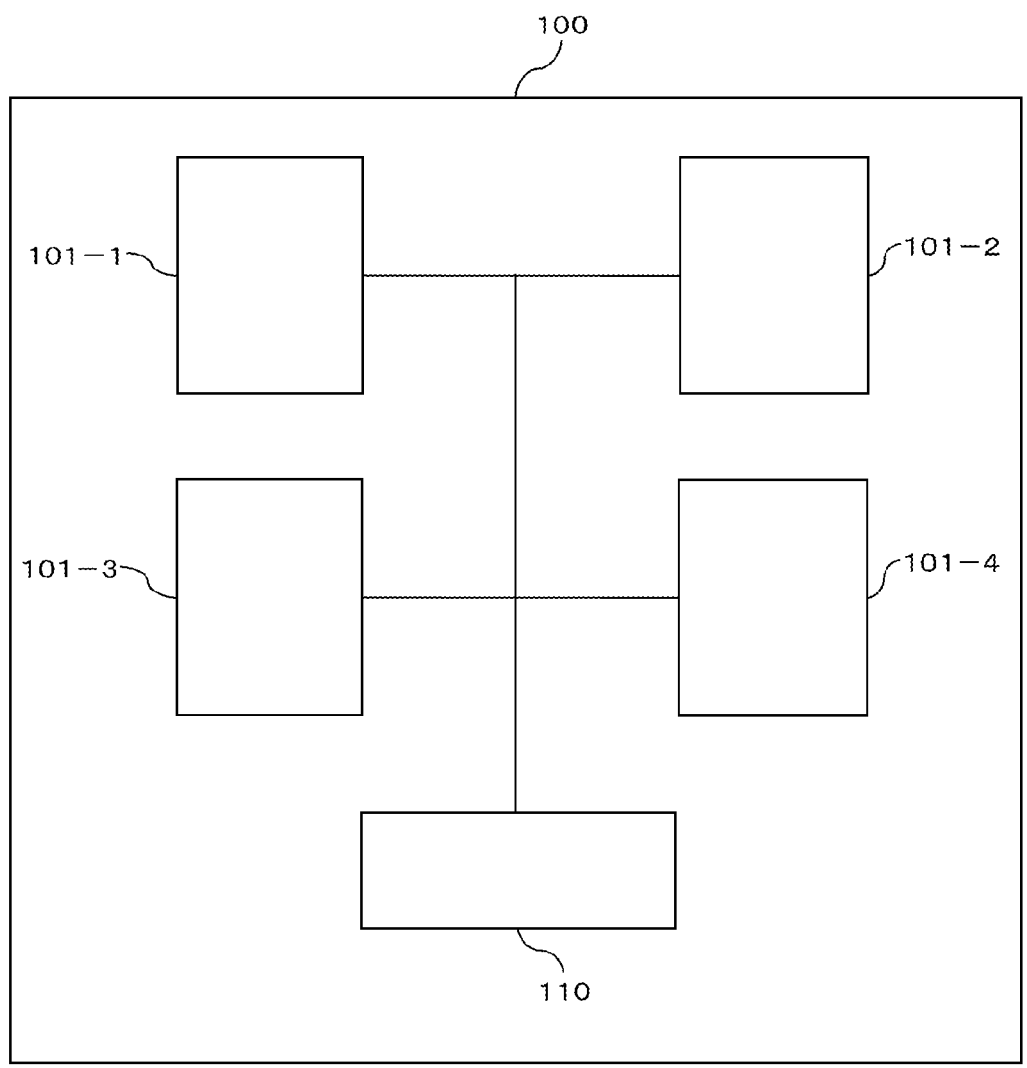
FIG. 25 is a diagram that schematically illustrates the hardware configuration of a switch included in the parallel computer system as the example of the fifth embodiment.

FIG. 24 is a diagram that schematically illustrates the configuration of a parallel computer system 1 as an example of a fifth embodiment. FIG. 25 is a diagram that schematically illustrates the hardware configuration of a switch 100 included in the parallel computer system 1.

The parallel computer system 1 illustrated in FIG. 24 has the network configuration of an N-dimensional mesh (here, N=2), and five-port switches 100 as illustrated in FIG. 25 are arranged at lattice points of the network having a lattice shape of two dimensions formed by the X and Y directions. In addition, a computation node 200 is connected to each switch 100. Hereinafter, the X direction may be referred to as dimension X, and the Y direction may be referred to as dimension Y.

In the example illustrated in FIG. 24, the parallel computer system 1 has the network configuration of a two-dimensional lattice shape of four rows (X=1 to 4) in the X direction and four rows (Y=1 to 4) in the Y direction and includes 16 switches 100 and 16 computation nodes 200.

Hereinafter, for the convenience of description, individual switches 100 of the parallel computer system 1 illustrated in FIG. 24 may be specified using X and Y coordinate values. For example, the switch 100, to which the computation node 200 (hereinafter, it may be referred to as node A) denoted by reference sign A is connected, positioned on the upper left side in FIG. 24 is represented as a switch 100 (1, 4) using the coordinates (1, 4) thereof. Similarly, the switch 100, to which the computation node 200 (hereinafter, it may be referred to as node F) denoted by reference sign F is connected, positioned on the lower right side in FIG. 24 is represented as a switch 100 (4, 1) using the coordinates (4, 1) thereof. Similarly, each switch 100 or each computation node 200 is specified.

In the example illustrated in FIG. 24, node B is connected to a switch 100 (2, 4), node C is connected to a switch 100 (1, 3), node D is connected to a switch 100 (4, 4), and node E is connected to a switch 100 (4, 3).

In the example illustrated in FIG. 24, a state is represented in which nodes A, B, and C transmit packets to node F.

Also in the parallel computer system 1, dimension order routing that matches the coordinates in order of X and Y as illustrated in FIG. 12 is performed.

In this fifth embodiment, the five-port switch 100 as illustrated in FIG. 25 is used. In this five-port switch 100, four network ports 101-1 to 101-4 are included.

Among such four network ports 101-1 to 101-4, for example, the network ports 101-1 and 101-2 are used for communication in the X direction, and the network ports 101-3 and 101-4 are used for communication in the Y direction.

Accordingly, each transmission node number storing unit 105 included in the network port 101-1 or 101-2 stores information of the transmission node number for the packet communication of the X direction in the network 2. In other words, the network ports 101-1 and 101-2 belong to the dimension X. In addition, each transmission node number storing unit 105 included in the network port 101-3 or 101-4 stores information of the transmission node number for the packet communication of the Y direction in the network 2. In other words, the network ports 101-3 and 101-4 belong to the dimension Y.

Hereinafter, as a reference sign that represents a network port, while one of reference signs 101-1 to 101-4 will be used in a case where one of a plurality of the network ports needs to be specified, reference sign 101 will be used in a case where an arbitrary network port is to be represented. The computation node 200 is connected to the node port 110.

In FIG. 25, the configuration of each network port 101 and the like is not illustrated for convenience. In addition, in FIG. 24, for the convenience of description, the configuration of each switch 100 is not illustrated, and the transmission node number storing unit 105 of only some switches 100 are illustrated.

Hereinafter, in FIG. 24, for example, like the switch 100 (1, 4), the transmission node number storing unit 105 illustrated inside the switch 100 represents the transmission node number storing unit 105 included in the port transmission unit 102 of the network port 101 used for the communication of the X direction. In addition, like the switch 100 (4, 4), the transmission node number storing unit 105 illustrated outside the switch 100 represents the transmission node number storing unit 105 included in the port transmission unit 102 of the network port 101 used for the communication of the Y direction.

In the parallel computer system 1 according to the fifth embodiment, in the transmission node number storing unit 105, information of the transmission source node for the communication of the dimension to which the network port 101 included in the transmission node number storing unit 105 belongs is stored.

In addition, in the communication route of packets, in the switch 100 in which the dimension is changed, instead of the transmission state information of the network port 101 of the dimension before the change, the information of the switch 100 is set in the transmission node number storing unit 105 of the network port 101 of the dimension after the change.

Here, the change in the dimension represents a change in the communication route to the direction of another dimension by transmitting a packet passing through the communication route of the direction of one dimension from the network port 101 belonging to the one dimension to the port transmission unit 102 belonging to another dimension in the switch 100. For example, in a two-dimensional network 2 formed by the dimensions X and Y, it represents that the communication route is changed to the Y direction (or the X direction) by transmitting a packet passing through the communication route of the X direction (or the Y direction) from the network port 101 belonging to the dimension X (or the dimension Y) to the port transmission unit 102 belonging to another dimension Y (or dimension X) in the switch 100.

More specifically, for example, in the parallel computer system 1 including the network 2 illustrated in FIG. 24, a packet transmitted from node A to node F first passes through the route of the X direction (dimension X) in order of the switches 100 (1, 4), 100 (2, 4), 100 (3, 4), and 100 (4, 4). Then, the dimension is changed at the switch 100 (4, 4) to the route of the Y direction (dimension Y). Thereafter, the packet passes through the route of the Y direction in order of switches 100 (4, 4), 100 (4, 3), 100 (4, 2) and 100 (4, 1) and arrives at node F.

Here, through the switch 100 (4, 4) to which node D is connected, actually, a packet transmitted from node A and a packet transmitted from node B pass. Accordingly, in the transmission node number storing unit 105 of the network port 101 of the X direction of the switch 100 (2, 4) to which node B is connected, information of transmission source nodes A and B is stored. More specifically, in the transmission node information storing unit 122, "in the state of transmission" of each one of the transmission nodes A and B is set in the transmission node information storing unit, and a count value "2" is set in the counter 121. In FIG. 24, such transmission state information of the transmission source nodes A and B, which is registered in the transmission node number storing unit 105, is represented using signs "A" and "B" specifying the transmission source nodes.

Then, at the switch 100 (4, 4) to which node D is connected in the communication route of packets transmitted from these nodes A and B, as described above, a change in the dimension from the X direction (first dimension) to the Y direction (second dimension) is made. In this switch 100 (4, 4), instead of the transmission state information ("A" and "B" in FIG. 24) of the network port 101 of the dimension (X direction) before the change, the transmission state information ("D" in FIG. 24) of the switch 100 is set in the transmission node number storing unit 105 of the network port 101 of the dimension (Y direction) after the change.

When this change in the dimension is made, even in a case where the transmission state information of two or more transmission source nodes of the dimension before the change is stored, in the dimension after the change, the transmission state information is replaced with the transmission state information of one computation node 200 connected to the switch 100.

In other words, the transmission state information of two or more transmission source nodes on the one dimension in the network 2 is stored in the switch 100 at which a change in the dimension is made as the transmission state information of the computation node 200 connected to the switch 100.

In other words, in the communication route of packets, at the switch 100 at which a change from the communication path of the dimension X to the communication path of the dimension Y is made, instead of the transmission state information on the communication path of the dimension X before the change, the transmission state information of the computation node 200 (4, 4) of the network port 101 corresponding to the dimension Y after the change is stored in the transmission node number storing unit 105.

Hereinafter, the replacement of the transmission state information of two or more transmission source nodes of the direction of the one dimension with the transmission state information of the computation node 200, which is connected to the switch 100, of the direction of another dimension in accordance with a change in the dimension in the switch 100 will be referred to as being "settled" or "converted".

For example, in the switch 100 (4, 4), the transmission state information of nodes A and B is settled to be the transmission state information of node D having the same address of the Y dimension as that of nodes A and B so as to be stored.

Similarly, also in the switch 100 (4, 3) to which node E is connected, the transmission state information representing the transmission source node C of the dimension of the X direction is settled to be the transmission state information representing node E. In addition, through this switch 100 (4, 3), in the route of the Y direction, a packet output from the switch 100 (4, 4) passes as well. Accordingly, in the transmission node number storing unit 105 of the switch 100 (4, 3), the transmission state information representing node D is also stored. In other words, in the transmission node number storing unit 105 of the switch 100 (4, 3), the transmission state information of nodes D and E is stored.

FIG. 26 is a diagram that schematically illustrates an example of the format of the transmission node number that is stored in a transmission packet of the parallel computer system 1 as the example of the fifth embodiment.

In this fifth embodiment, the transmission node number stored in the packet, as illustrated in FIG. 26, includes a transmission node number of the dimension X and a transmission node number of the dimension Y.

In the switch 100 of this fifth embodiment, each network port 101 stores the transmission state information of the transmission source node of the direction of the dimension to which the network port 101 belongs in the transmission node number storing unit 105. In addition, in a case where the counter 121 is included in the transmission node number storing unit 105, the transmission node number of the transmission node of the direction of the dimension to which the network port 101 belongs is stored in the counter 121. In other words, the transmission state information is stored in the transmission node number storing unit 105 for each dimension.

The network interface 203 of the remote node that has received the packet directly writes the transmission node number of the received packet into a response packet and returns the response packet to the local node.

Then, in the network interface 203 of the local node that has received the response packet, the gap control unit 207 calculates a transmission node number as a value acquired by withdrawing the number of changes of the packet in the dimension on the route from the transmission source node to the transmission destination node from a sum of the transmission node numbers of respective dimensions that are read from the packet. In other words, in the example illustrated in this fifth embodiment, the transmission node number is calculated based on the following Equation (2).

$$\text{Transmission Node Number} = (\text{Transmission Node Number of Dimension } X) + (\text{Transmission Node Number of Dimension } Y) - (\text{Number of Changes in Dimension}) \quad (2)$$

In addition, between the local node address and the remote node address, values of respective dimensions are compared with each other, and the number of dimensions having mutually different values may be used as the number of changes of the packet in dimension.

In addition, in the parallel computer system 1, the transmission route of a packet is determined based on a combination of the transmission source node and the transmission destination node. Accordingly, based on the combination of the transmission source node and the transmission destination node, "the number of times of moving beyond the dimension" on the communication route can be easily acquired. In addition, between the local node address and the remote node address, values of respective dimensions are compared with each other, and the number of dimensions having mutually different values may be regarded as the number of times of moving beyond the dimension.

The gap control unit 207 calculates a gap length based on the following Equation (3) by using the transmission node number calculated using Equation (2) described above.

$$\text{Gap Length} = \text{Packet Size} \times (\text{Transmission Node Number} - 1) \times \alpha \quad (3)$$

Here, $\alpha$ is a parameter (here, $\alpha > 1$), and the gap length is adjusted by multiplying the predetermined parameter $\alpha$. This is for correcting a case where the transmission node number does not coincide with an actual value in a part of the area of the network 2 as below in accordance with the technique used for this fifth embodiment.

For example, in the example illustrated in FIG. 24, in the switch 100 (0, 4) to which node A is connected and the switch 100 (2, 4) to which node B is connected, the transmission node number of the X direction is 2, and the transmission node number of the Y direction is 2. In addition, in the switch 100 (4, 4), the dimension is changed once from the X direction to the Y direction. Accordingly, based on Equation (2) described above, it is acquired that the transmission node number=2+2−1=3.

Node F that has received a packet transmits a response packet in which this transmission node number of "3" is stored to nodes A and B.

This transmission node number of "3", in the example illustrated in FIG. 24, coincides with the number of nodes (three nodes A, B, and C) that actually transmit packets to node F.

Meanwhile, in the switch 100 (1, 3) to which node C is connected, the transmission node number of the X direction is "1", and the transmission node number of the Y direction is "2". In addition, in the switch 100 (4, 3), the dimension is changed once from the X direction to the Y direction. Accordingly, based on Equation (2) described above, it is acquired that the transmission node number=1+2−1=2.

Node F that has received a packet transmits a response packet in which this transmission node number of "2" is stored to nodes A and B.

This transmission node number of "2", in the example illustrated in FIG. 24, does not coincide with the number of nodes (three nodes A, B, and C) that actually transmit packets to node F and is smaller than the actual transmission node number.

As above, in the parallel computer system 1 as the example of this fifth embodiment, in the route, when packets are transmitted from a plurality of nodes positioned at addresses of which the dimensions are different from each other, there is a case where the transmission node number is smaller than the actual value. However, by storing the transmission state information of only a dimension to which the network port 101 belongs in the transmission node number storing unit 105, the required capacity of a storage unit used as the transmission node number storing unit 105 can be markedly reduced.

In other words, by storing only the transmission state information of the dimension to which the network port 101 belongs in a limited manner, a capacity capable of storing N units of the transmission state information may be provided in the storage unit, and the manufacturing cost can be reduced. In contrast to this, for example, in the case of a two-dimensional mesh or a torus in which the node number of each dimension is N, in order to store the transmission state information of all the nodes, a capacity for storing the N×N units of the transmission state information is required for each network port 101 as a capacity of the storage unit, and the manufacturing cost is high.

Figure 27:
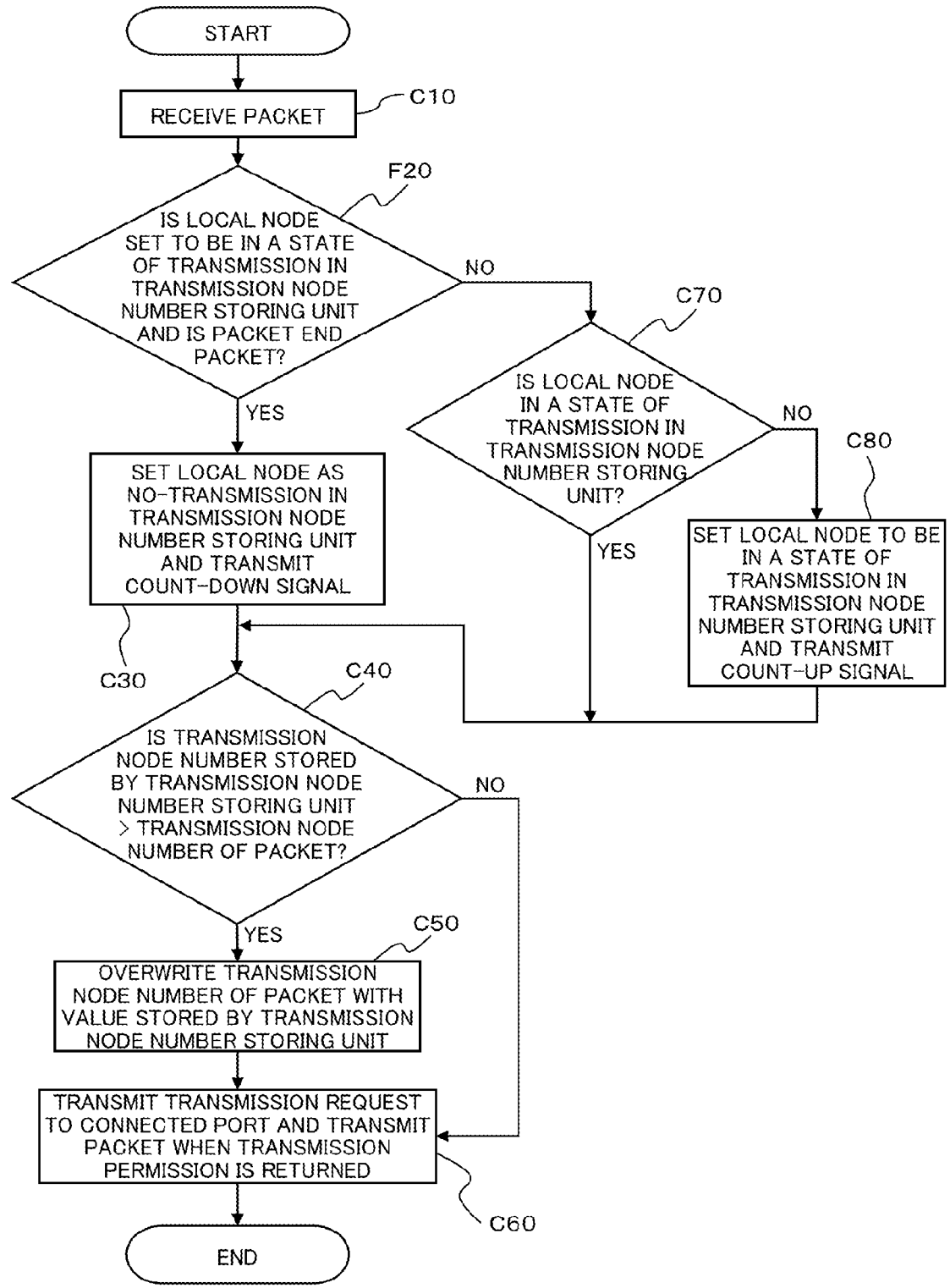
FIG. 27 is a flowchart that illustrates the process of a port transmission unit in the parallel computer system as the example of the fifth embodiment.

The process of the port transmission unit 102 of the parallel computer system 1 as the example of the fifth embodiment configured as described above will be described along a flowchart (Steps C10, F20, and C30 to C80) represented in FIG. 27. Hereinafter, since each step to which the same reference sign as the reference sign described above represents the same process, the description thereof will not be presented.

When a packet transmitted from the port reception unit 114 or the port reception unit 106 is received, the port transmission unit 102 stores the received packet in the buffer 103 (Step C10).

The transmission control unit 104 checks the transmission node information storing unit 122 based on the local node of the packet (Step F20). In other words, it is checked whether or not the local node is set to be "in the state of transmission" in the transmission node information storing unit 122 and the packet is an end packet.

In a case where the local node is set to be "in the state of transmission" in the transmission node information storing unit 122, and the packet is an end packet (see the Yes route of Step F20), the process proceeds to Step C30.

On the other hand, when it is not the case where the local node is set to be "in the state of transmission" in the transmission node information storing unit 122, and the packet is not an end packet (see the No route of Step F20), the process proceeds to Step C70.

As above, according to the parallel computer system 1 as the example of the fifth embodiment, not only the same operations and advantages as those of the second embodiment described above are acquired, but also, in a case where the N-dimensional mesh network configuration is employed, by storing the transmission state information of only a dimension to which the network port 101 belongs in the transmission node number storing unit 105, the required capacity of the storage unit used as the transmission node number storing unit 105 can be reduced.

In other words, by storing only the transmission state information of the dimension to which the network port 101 belongs in a limited manner, the manufacturing cost can be reduced.

(G) Sixth Embodiment

In the parallel computer system 1 as an example of each embodiment or a modified example thereof described above, the transmission destination node that has received a transmission packet transmits a response packet including the transmission node number to the transmission source node as a response.

In the parallel computer system 1 as the example of this sixth embodiment, the switch 100 transmits the response packet including the transmission node number to the transmission source node as a response. In other words, in the parallel computer system 1 as the example of this sixth embodiment, the switch 100 includes the function of a transmission node number transmitting unit 23.

More specifically, in the port transmission unit 102 of the switch 100, the transmission control unit 104 compares the transmission node number of the packet and the transmission node number of the port stored in the transmission node number storing unit 105 with each other.

Then, in a case where the transmission node number stored in the transmission node number storing unit 105 is larger than the transmission node number of the packet, the transmission control unit 104 generates a response packet in which the transmission node number of the port is written and returns the generated response packet to the local node of the packet.

Here, the format and the generation technique of the response packet may be realized by using the same technique as that of the first embodiment, and the detailed description thereof will not be presented.

Figure 28:
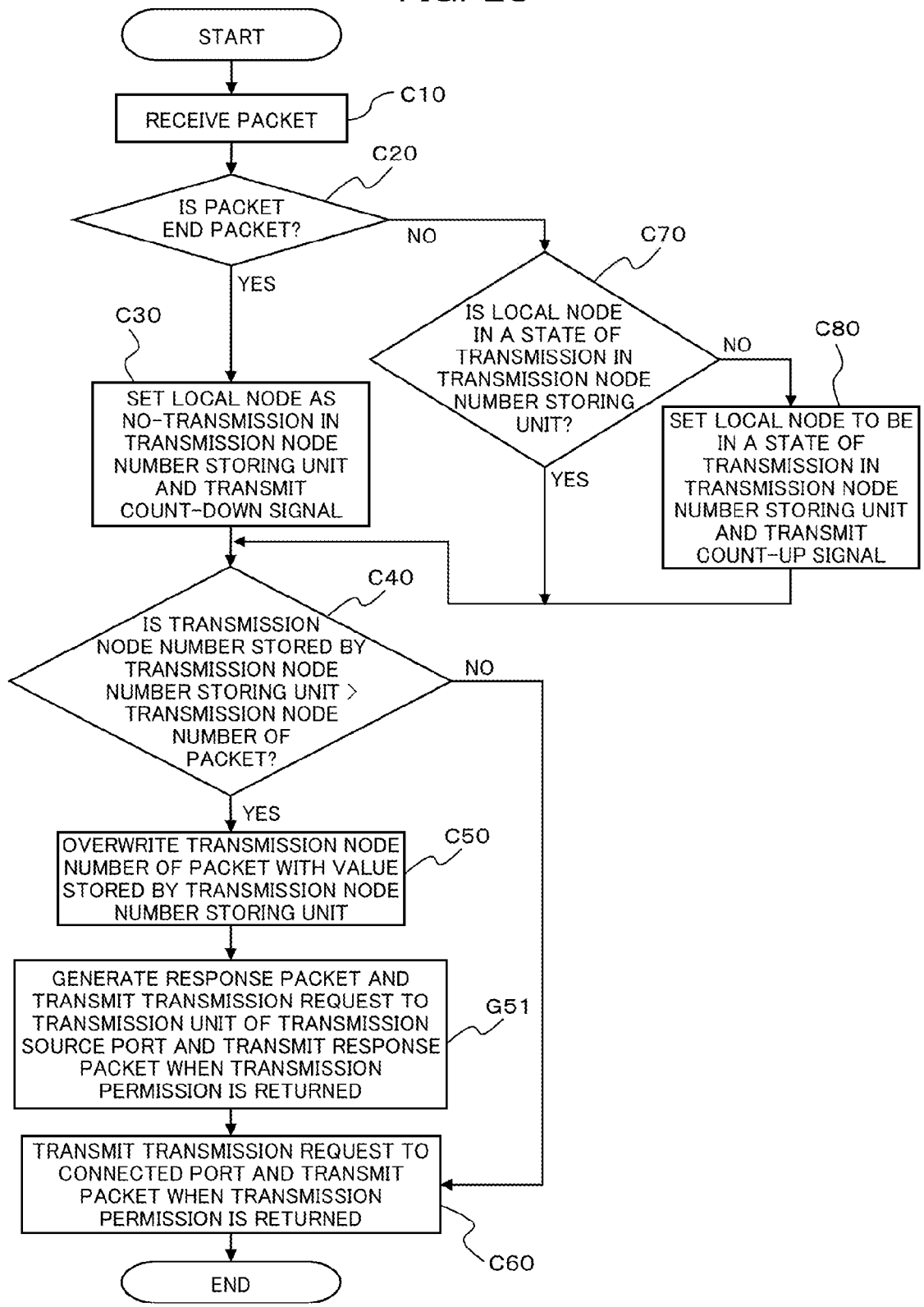
FIG. 28 is a flowchart that illustrates the process of a port transmission unit in a parallel computer system as an example of a sixth embodiment.

The process of the port transmission unit 102 of the parallel computer system 1 as the example of the sixth embodiment will be described along a flowchart (Steps C10 to C50, G51, and C60 to C80) represented in FIG. 28. Hereinafter, since each step to which the same reference sign as the reference sign described above represents the same process, the description thereof will not be presented.

The transmission control unit 104 (comparison unit 13) compares the transmission node number managed by the transmission node number storing unit 105 and the transmission node number stored in the packet with each other (Step C40). As a result of this comparison, in a case where the transmission node number managed by the transmission node number storing unit 105 is larger than the transmission node number of the packet (see the Yes route of Step C40), the transmission control unit 104 overwrites the value of the transmission node number of the packet with the transmission node number of the transmission node number storing unit 105 (Step C50).

The transmission control unit 104 generates a response packet based on the overwritten transmission node number of the packet. Then, the transmission control unit 104 transmits a transmission request to the port transmission unit 102 of the network port 101 that is the transmission source. When a transmission permission is received from the port transmission unit 102 as a response, the transmission control unit 104 transmits the response packet (Step G51).

Thereafter, the transmission control unit 104 transmits a transmission request to the network port 101 of another switch 100 that is connected thereto. Then, when a transmission permission is received from the network port 101 as a response, the transmission control unit 104 transmits a packet to the corresponding network port 101 (Step C60), and the process ends.

In addition, in the network interface 203 of the local node that has received the response packet, similar to the first embodiment, the transmission node number is transmitted to the gap control unit 207, and the packet transmitting unit 206 is controlled so as to insert a gap.

As above, according to the parallel computer system 1 as the example of the sixth embodiment, in the switch 100, when the transmission node number increases at the time of transmitting a packet, a response packet is generated and is returned to the transmission source node. Accordingly, compared to a case where a response packet is returned from the transmission destination node, the transmission source node is notified of the communication state of the network 2 in a speedy manner, and packet transmission at an optimal gap length can be performed. In other words, the communication state of the network 2 can be reflected on the transmission source node in a speedy manner.

In addition, in the parallel computer system 1 as the example of the sixth embodiment described above, the switch 100 returning the response packet to the transmission source node may be configured to be limited to a specific switch 100. Accordingly, the influence of an increase in the network traffic or the like that may occur due to the transmission of the response packets from all the switches 100 can be reduced.

In addition, it is preferable that the switch 100 having the function of returning the response packet is limited to a switch 100 on which the communication is predicted to be concentrated such as a switch positioned at the center in a case where the topology of the network 2 is a mesh.

(H) Seventh Embodiment

Figure 29:
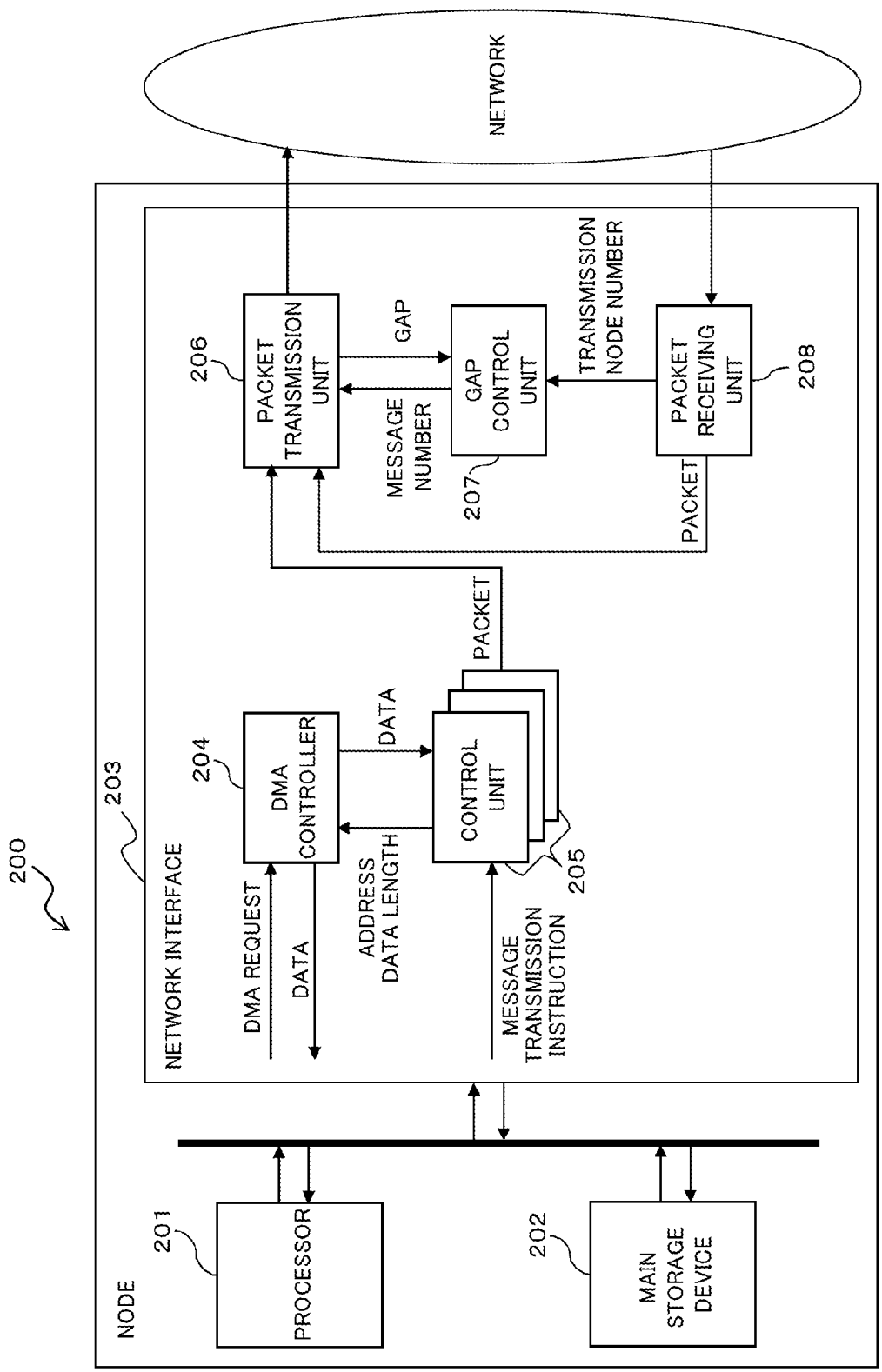
FIG. 29 is a diagram that schematically illustrates the configuration of a computation node of a parallel computer system as an example of a seventh embodiment.

FIG. 29 is a diagram that schematically illustrates the configuration of a computation node 200 of a parallel computer system 1 as an example of a seventh embodiment.

As illustrated in FIG. 29, the computation node 200 of the seventh embodiment has the same configuration as that of the computation node 200 of the first embodiment except that a plurality of control units 205 are included. Hereinafter, in the drawings, like reference signs denote like portions, and detailed description thereof will not be presented.

In the parallel computer system 1 according to this seventh embodiment, data transmitted from each node 200 is transmitted and received in a state being divided into packets. In addition, the length of this packet may be appropriately set and may be appropriately set as a fixed length or a variable length.

In the parallel computer system 1 as the example of the seventh embodiment, each control unit 205 that has received a message transmission instruction from the processor 201 generates a packet and transmits the generated packet to the packet transmitting unit 206.

In a case where the processor 201 makes a plurality of message transmission instructions, and the plurality of control units 205 transmit packets to the packet transmitting unit 206, the packet transmitting unit 206 transmits the packets in a time-divisional manner.

FIG. 30 is an exemplary diagram that schematically illustrates the format of the transmission packet in the parallel computer system 1 as the example of the seventh embodiment. The format of the transmission packet of the parallel computer system 1 as the example of the seventh embodiment includes a start flag in addition to the format of the transmission packet of the second embodiment illustrated in FIG. 15.

The other portion of the transmission packet is the same as the above-described information included in the packet described with reference to FIG. 15 and the like, and thus, the detailed description thereof will not be presented.

Hereinafter, in the drawings, like reference signs denote like portions, and detailed description thereof will not be presented.

In the transmission source node, when a message is transmitted with being divided into a plurality of packets, the network interface 203 sets the start flag, for example, to "1" for a start packet. On the other hand, for packets other than the start packet, "0" is set to each start flag. Such "1" of the start flag corresponds to start identification information that represents that the packet (divided data) is a start packet.

The setting of "0" or "1" to the start flag, for example, may be performed either by the control unit 205 or by the packet transmitting unit 206.

Figure 31:
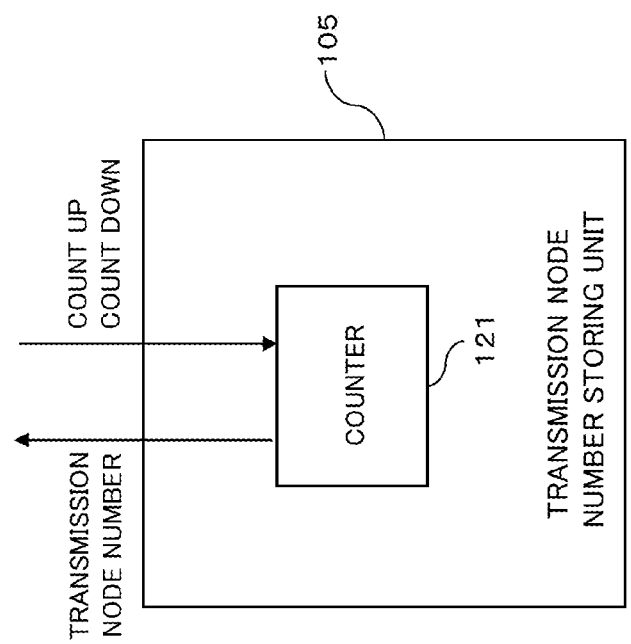
FIG. 31 is a diagram that illustrates the configuration of a transmission node number storing unit of the parallel computer system as the example of the seventh embodiment.

FIG. 31 is a diagram that illustrates the configuration of the transmission node number storing unit 105 of the parallel computer system 1 as the example of the seventh embodiment. The transmission node number storing unit 105 of the parallel computer system 1 as the example of the seventh embodiment illustrated in FIG. 31 is acquired by excluding the transmission node number storing unit 105 from the transmission node number storing unit 105 of the first embodiment and includes only a counter 121.

In the switch 100 including the transmission node number storing unit 105 as the seventh embodiment, the counter 121 changes the count value based on a count-up signal or a count-down signal transmitted from the transmission control unit 104.

When a packet (start packet) for which "1" is set to the start flag is transmitted to another switch 100, the transmission control unit 104 causes the counter 121 to perform count-up by transmitting a count-up signal to the counter 121.

In addition, when an end packet for which "1" is set to the end flag is transmitted, the transmission control unit 104 causes the counter 121 to perform count down by transmitting a count-down signal to the counter 121.

The timing of the count-up or count-down of the counter 121 is not limited thereto, and various modifications can be made. For example, when a start packet is received by the port reception unit 106, the reception control unit 108 may cause the counter 121 to perform count up by transmitting a count-up signal to the counter 121.

Similarly, when an end packet is received by the port reception unit 106, the reception control unit 108 may cause the counter 121 to perform count down by transmitting a count-down signal to the counter 121.

Figure 32:
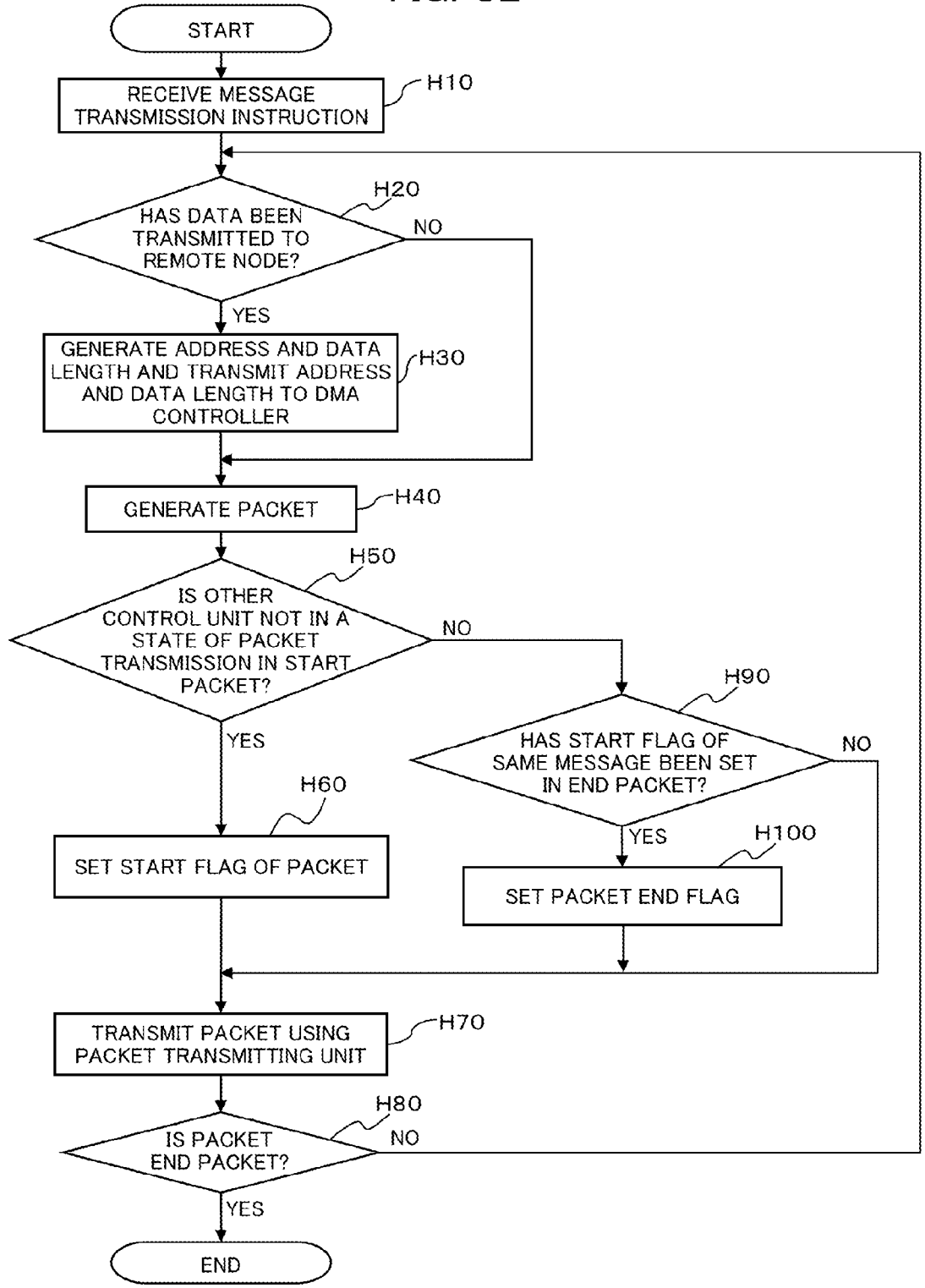
FIG. 32 is a flowchart that illustrates the process of a network interface of a computation node as a transmission source node in the parallel computer system as an example of the seventh embodiment.

The process of the network interface 203 of the computation node 200 as the transmission source node in the parallel computer system 1 as the example of the seventh embodiment configured as described above will be described along a flowchart (Steps H10 to H100) illustrated in FIG. 32.

The control unit 205 receives a message transmission instruction from the processor 201 (Step H10). The control unit 205 checks whether or not the message transmission instruction is an instruction for the transmission of data stored in the main storage device 202 by checking the message transmission instruction (Step H20). As a message transmission instruction for the instruction of the transmission of the data stored in the main storage device 202, for example, there is a Put request. In addition, as a message transmission instruction not for the transmission of the data stored in the main storage device 202, for example, there is a Get request or a simple command transmission.

In a case where the message transmission instruction is for the transmission of data to a remote node (see the Yes route of Step H20), the control unit 205 divides target data and generates an address of the main storage device 202 and the data length of data to be transmitted in one packet. The control unit 205 causes the DMA controller 204 to read the data to be transmitted from the main storage device 202 by transmitting the generated information to the DMA controller 204 (Step H30).

The control unit 205 generates a packet to be transmitted based on the message transmission instruction transmitted from the processor 201 (Step H40). For example, in a case where data transmission is performed, a packet is generated by combining the data read by the DMA controller 204 and a header that is generated based on the information acquired from the message transmission instruction and the like. On the other hand, in a case where the message transmission instruction is not for the transmission of data (see the No route of Step H20), a packet to be transmitted is generated based on the message transmission instruction.

Thereafter, the control unit 205 checks that the generated packet is a start packet of a message, and the other control units 205 are not in the state of transmission of packets (Step H50).

In a case where the generated packet is a start packet of a message, and the other control units 205 are not in the state of transmission of packets (see the Yes route of Step H50), the start flag of the packet is enabled (Step H60). For example, "1" is set to the start flag. Then, the control unit 205 transmits the packet using the packet transmitting unit 206 (Step H70).

On the other hand, in a case where the generated packet does not satisfy the condition of being a start packet of a message and the other control units 205 being not in the state of transmission of packets (see the No route of Step H50), next, it is checked whether or not the packet is an end packet, and the start flag of the start packet of the same message is set to be enabled (Step H90).

In a case where the condition of the packet being an end packet and the start flag being set to be enabled in the same message is not satisfied (see the No route of Step H90), the process proceeds to Step H70.

On the other hand, in a case where the condition of the packet being an end packet and the start flag being set to be enabled in the same message is satisfied (see the Yes route of Step H90), the end flag of the packet is enabled. In other words, for example, "1" is set to the end flag (Step H100). Thereafter, the process proceeds to Step H70.

Then, the control unit 205 checks whether or not the packet is an end packet (Step H80). In a case where the packet is not an end packet (see the No route of Step H80), the process is returned to Step H20. On the other hand, in a case where the packet is an end packet (see the Yes route of Step H80), the process ends.

Figure 33:
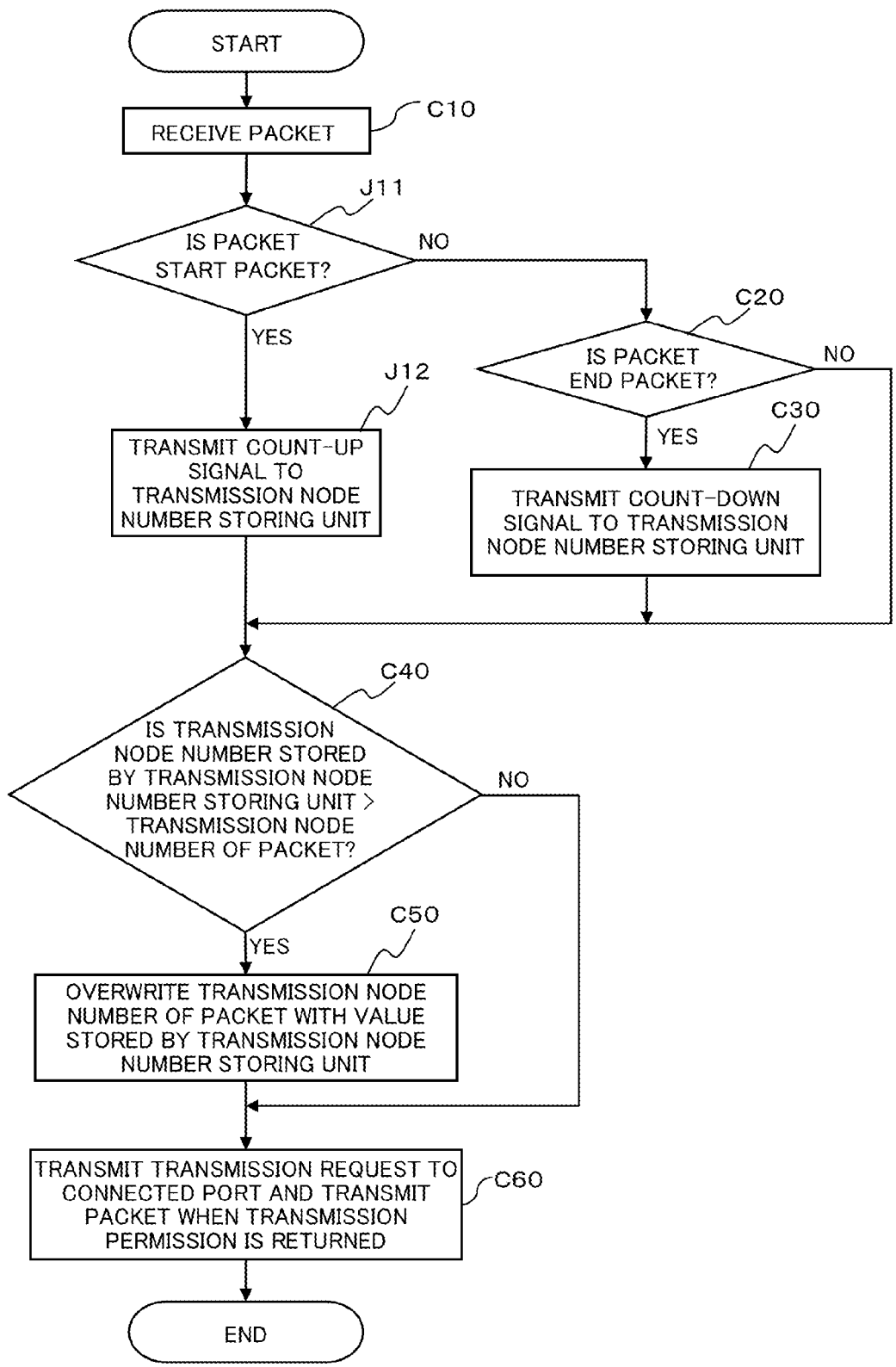
FIG. 33 is a flowchart that illustrates the process of a port transmission unit in the parallel computer system as the example of the seventh embodiment.
Figure 34:
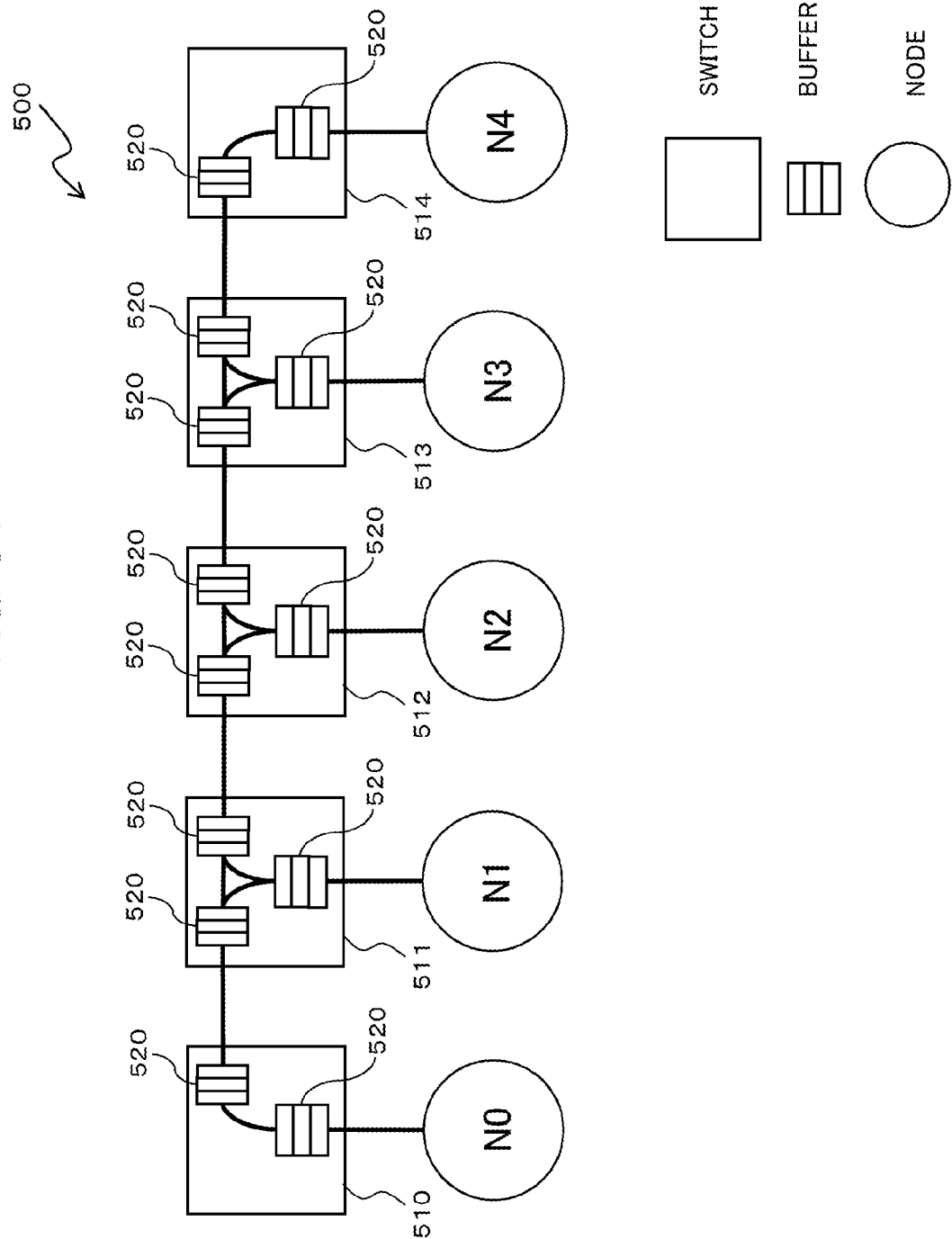
FIG. 34 is a diagram that illustrates an example of the configuration of a parallel computer.

Next, the process of the port transmission unit 102 of the parallel computer system 1 as the example of the seventh embodiment will be described along a flowchart (Steps C10, J11, J12, and C20 to C60) represented in FIG. 33. Hereinafter, in FIG. 33, since each step to which the same reference sign as the reference sign described above represents the same process, the description thereof will not be presented.

When a packet transmitted from the port reception unit 114 or the port reception unit 106 is received, the port transmission unit 102 stores the received packet in the buffer 103 (Step C10).

The transmission control unit 104 checks whether or not the packet is a start packet by checking the start flag of the received packet (Step J11). As a result of this checking process, in a case where the packet is a start packet (see the Yes route of Step J11), the transmission control unit 104 counts up (+1) the count value by transmitting a count-up signal to the transmission node number storing unit 105 (counter 121) (Step J12). Thereafter, the process proceeds to Step C40.

On the other hand, in a case where the packet is not a start packet (see the No route of Step J11), the process proceeds to Step C20.

As above, according to the parallel computer system 1 as the example of the seventh embodiment, the same operations and advantages as those of the above-described second embodiment are acquired, and, in the switch 100, the transmission node number storing unit 105 includes only the counter 121, and the transmission node number is managed based on the count value.

Accordingly, a storage area for storing the transmission node state information like the transmission node information storing unit 122 does not need to be prepared, and the required capacity of the storage unit used as the transmission node number storing unit 105 can be reduced. Accordingly, the manufacturing cost can be reduced.

In addition, the transmission flag and the end flag are included in the transmission packet. In a case where one transmission source node transmits a plurality of messages in a time divisional manner, by enabling the start flag and the end flag only for one message, the transmission node number can be accurately counted, whereby the reliability can be improved.

(I) Others

The present invention is not limited to the embodiments described above, but various changes can be made therein in a range not departing from the concept of the present invention.

In addition, as each embodiment of the present invention is disclosed, the present invention can be performed by those skilled in the art.

Congestion control matching the communication state of a communication route can be efficiently realized.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:
1. A computer system comprising:
a plurality of communication control devices;
a plurality of computation nodes of transmission sources that transmit data through the communication control devices; and
a plurality of computation nodes of transmission destinations that receive data through the communication control devices,
wherein each of the plurality of computation nodes of the transmission source:
transmits data to the computation node of the transmission destination; and adjusts an interval between data transmitted based on a transmission node number included in received control data, wherein each of the plurality of communication control devices:

inputs the data transmitted by the computation node of the transmission source;

outputs data to be transmitted to the computation node of the transmission destination;

stores the transmission node number representing the number of the computation nodes transmitting data through the communication control device into a transmission node number storing unit;

updates the transmission node number stored in the transmission node number storing unit in a case where the communication control device outputs data;

compares a transmission node number included in the data input and the transmission node number stored in the transmission node number storing unit with each other; and overwrites the transmission number included in the data output with the transmission node number stored in the transmission node number storing unit in a case where the transmission node number stored in the transmission node number storing unit is larger than the transmission node number included in the data input as a result of the comparison, and wherein each of the plurality of computation nodes of the transmission destination transmits the control data including the transmission node number included in the received data to the computation node of the transmission source.

2. The computer system according to claim 1, wherein the communication control device further:

compares a data size that is the size of the data input and a threshold set in advance with each other; and suppresses an update of the transmission node number stored in the transmission node number storing unit when the communication control device outputs the data in a case where the data size is less than the threshold as the result of the comparison.

3. The computer system according to claim 1, wherein the computation node of the transmission source generates a plurality of divided data pieces, and wherein the communication control device updates the transmission node number stored in the transmission node number storing unit in a case where the communication control device outputs a start data piece out of the plurality of generated data pieces.

4. The computer system according to claim 3, wherein the computation node of the transmission source adds start identification information that represents a start to the start data piece out of the plurality of divided data pieces, and wherein the communication control device updates the transmission node number stored in the transmission node number storing unit in a case where the data piece to which the start identification information is added is output.

5. The computer system according to claim 1, wherein the computation node of the transmission source generates a plurality of divided data pieces, and wherein the communication control device decreases the transmission node number stored in the transmission node number storing unit in a case where the communication control device outputs an end data piece out of the plurality of generated data pieces.

6. The computer system according to claim 5, wherein the computation node of the transmission source adds end identification information that represents an end to an end data piece of the plurality of data pieces together with generating the plurality of divided data pieces, and wherein the communication control device decreases the transmission node number stored in the transmission node number storing unit in a case where the communication control device outputs the data piece to which the end identification information is added.

7. The computer system according to claim 1, wherein the communication control device decreases the transmission node number stored in the transmission node number storing unit in a case where a predetermined time elapses after the transmission node number stored in the transmission node number storing unit is increased.

8. The computer system according to claim 1, wherein the communication control device includes a transmission node information storing unit that stores transmission node information representing a computation node that is in the state of transmitting data through the communication control device, and wherein, in a case where the communication control device outputs data, the communication control device refers to the transmission node information storing unit and, when the computation node of the transmission source of the data output by the communication control device is not included in the transmission node information, adds the computation node of the transmission source of the data in the transmission node information and updates the transmission node number stored in the transmission node number storing unit.

9. The computer system according to claim 8, wherein, in a case where a plurality of data pieces corresponding to a plurality of messages are transmitted, the computation node of the transmission source adds message identification information that identifies a corresponding message to the plurality of data pieces corresponding to the plurality of messages, wherein the transmission node information storing unit stores transmission node information for each message identification information, and wherein, in a case where the communication control device outputs data, the communication control device updates the transmission node number stored in the transmission node number storing unit for each message identification information.

10. The computer system according to claim 1, wherein a communication network that connects the communication control devices, the computation nodes of the transmission sources, and the computation nodes of the transmission destinations has a multi-dimensional network configuration connecting communication paths of multiple dimensions, wherein the transmission node number storing unit stores the transmission node number in association with each dimension, and wherein the communication control device of the communication control device that is disposed on a communication path from the computation node of the transmission source to the computation node of the transmission destination and performs a transfer from a communication path of one dimension to a communication path of another dimension stores the number of the computation nodes connected to the communication control device as a transmission node number corresponding to the another dimension after the transfer being set instead of the transmission node number of the communication path of the one dimension before the transfer.

11. A method of controlling a communication control device comprising:
  inputting data transmitted by a computation node of a transmission source that transmits data through the communication control device;
  outputting data to be transmitted to a computation node of a transmission destination that receives data through the communication control device;
  storing a transmission node number representing the number of the computation nodes transmitting data through the communication control device into a transmission node number storing unit;
  updating updates the transmission node number stored in the transmission node number storing unit in a case where the data is output to the computation node of the transmission destination;
  comparing a transmission node number included in the data input and the transmission node number stored in the transmission node number storing unit with each other; and
  overwriting the transmission number included in the data output with the transmission node number stored in the transmission node number storing unit in a case where the transmission node number stored in the transmission node number storing unit is larger than the transmission node number included in the data input as a result of the comparing.

12. A method of controlling a computer system that includes a plurality of communication control devices, a plurality of computation nodes of transmission sources that transmit data through the communication control devices, and a plurality of computation nodes of transmission destinations that receive data through the communication control devices, the method comprising:
  transmitting data to the computation node of the transmission destination using a data transmitting unit included in the computation node of the transmission source;
  adjusting an interval between data transmitted by the data transmitting unit based on the transmission node number included in received control data using an adjustment unit included in the computation node of the transmission source and inputting the data transmitted by the computation node of the transmission source using an input unit included in the communication control device;
  outputting data to be transmitted to the computation node of the transmission destination using an output unit included in the communication control device when a transmission node number storing unit included in the communication control device stores the transmission node number representing the number of the computation nodes transmitting data through the communication control device;
  updating the transmission node number stored by the transmission node number storing unit using an update processing unit included in the communication control device in a case where the output unit outputs data;
  comparing a transmission node number included in the data input by the input unit and the transmission node number stored by the transmission node number storing unit with each other using a comparison unit included in the communication control device; and
  overwriting the transmission number included in the data output by the output unit with the transmission node number stored by the transmission node number storing unit using an overwriting unit included in the communication control device in a case where the transmission node number stored by the transmission node number storing unit is larger than the transmission node number included in the data input by the input unit as a result of the comparison performed by the comparison unit; and
  transmitting the control data including the transmission node number included in the received data to the computation node of the transmission source using a control data transmitting unit included in the computation node of the transmission destination.

* * * * *